(12) United States Patent
Bonnevie et al.

(10) Patent No.: US 12,086,913 B2
(45) Date of Patent: *Sep. 10, 2024

(54) DISPLAY RESPONSIVE COMMUNICATION SYSTEM AND METHOD

(71) Applicant: Google LLC, Mountain View, CA (US)

(72) Inventors: Mikaël Bonnevie, Walnut Creek, CA (US); Yuanzhen Li, Newton Centre, MA (US); Ce Liu, Belmont, MA (US)

(*) Notice: Subject to any disclaimer, the term of this patent is extended or adjusted under 35 U.S.C. 154(b) by 57 days.

This patent is subject to a terminal disclaimer.

(21) Appl. No.: 17/961,388

(22) Filed: Oct. 6, 2022

(65) Prior Publication Data

US 2023/0021805 A1    Jan. 26, 2023

Related U.S. Application Data

(63) Continuation of application No. 17/009,194, filed on Sep. 1, 2020, now Pat. No. 11,481,941, which is a continuation-in-part of application No. 29/745,050, filed on Aug. 3, 2020.

(51) Int. Cl.
| | |
|---|---|
| *G06T 11/60* | (2006.01) |
| *G06T 3/40* | (2006.01) |
| *G06T 5/70* | (2024.01) |
| *G06T 7/194* | (2017.01) |

(52) U.S. Cl.
CPC .......... *G06T 11/60* (2013.01); *G06T 3/40* (2013.01); *G06T 5/70* (2024.01); *G06T 7/194* (2017.01); *G06T 2200/24* (2013.01)

(58) Field of Classification Search
CPC . G06T 11/60; G06T 7/194; G06T 5/70; G06T 3/40
See application file for complete search history.

(56) References Cited

U.S. PATENT DOCUMENTS

| | | |
|---|---|---|
| 6,373,499 B1 * | 4/2002 | Acker ............... G06T 5/00 |
| | | 345/619 |
| 9,569,078 B2 | 2/2017 | Cherna et al. |
| 10,430,987 B1 | 10/2019 | Hu et al. |
| 10,721,391 B2 | 7/2020 | Park et al. |
| 11,113,998 B2 | 9/2021 | Wu |

(Continued)

*Primary Examiner* — Terrell M Robinson
(74) *Attorney, Agent, or Firm* — Leason Ellis LLP

(57) ABSTRACT

A multimedia communication system and computer-implemented method for transmitting auxiliary display content to an end-user communication device to be rendered on a display device with a special effect to emphasize an image included in the auxiliary display content, comprising a processor and a transmitter. The processor can be arranged to analyze image data included in an auxiliary display content, detect an object image or a background image in the auxiliary display content based on the analysis of the image data, determine a special effect based on the analysis of the image data, and apply the special effect to the auxiliary display content to modify display properties for the auxiliary display content such that the object image is emphasized or pops-out. The transmitter can be arranged to send the auxiliary display content with modified display properties to an end-user communication device. The special effect can comprise a non-customization special effect, a simple foreground special effect or a selective foreground special effect.

18 Claims, 15 Drawing Sheets

(56) References Cited

U.S. PATENT DOCUMENTS

| | | | |
|---|---|---|---|
| 2006/0285034 A1* | 12/2006 | Aratani | H04N 21/4318 |
| | | | 386/E5.07 |
| 2011/0050685 A1 | 3/2011 | Yamada | |
| 2012/0079390 A1* | 3/2012 | Ballagh | G06F 3/0481 |
| | | | 715/738 |
| 2014/0184588 A1 | 7/2014 | Cheng et al. | |
| 2016/0269639 A1 | 9/2016 | Chang | |
| 2017/0139573 A1 | 5/2017 | Li et al. | |
| 2017/0236332 A1 | 8/2017 | Kipman et al. | |
| 2017/0262247 A1 | 9/2017 | Yoganandan et al. | |
| 2018/0097866 A1 | 4/2018 | Corchs et al. | |
| 2018/0227482 A1 | 8/2018 | Holzer et al. | |
| 2018/0082117 A1 | 12/2018 | Sharma et al. | |
| 2020/0082022 A1* | 3/2020 | Bonnevie | G06F 40/106 |
| 2020/0134841 A1 | 4/2020 | Toyoda | |
| 2020/0327648 A1* | 10/2020 | Lin | G06T 5/70 |
| 2020/0410735 A1 | 12/2020 | Gorbatyuk et al. | |
| 2021/0073874 A1 | 3/2021 | Wish | |

* cited by examiner

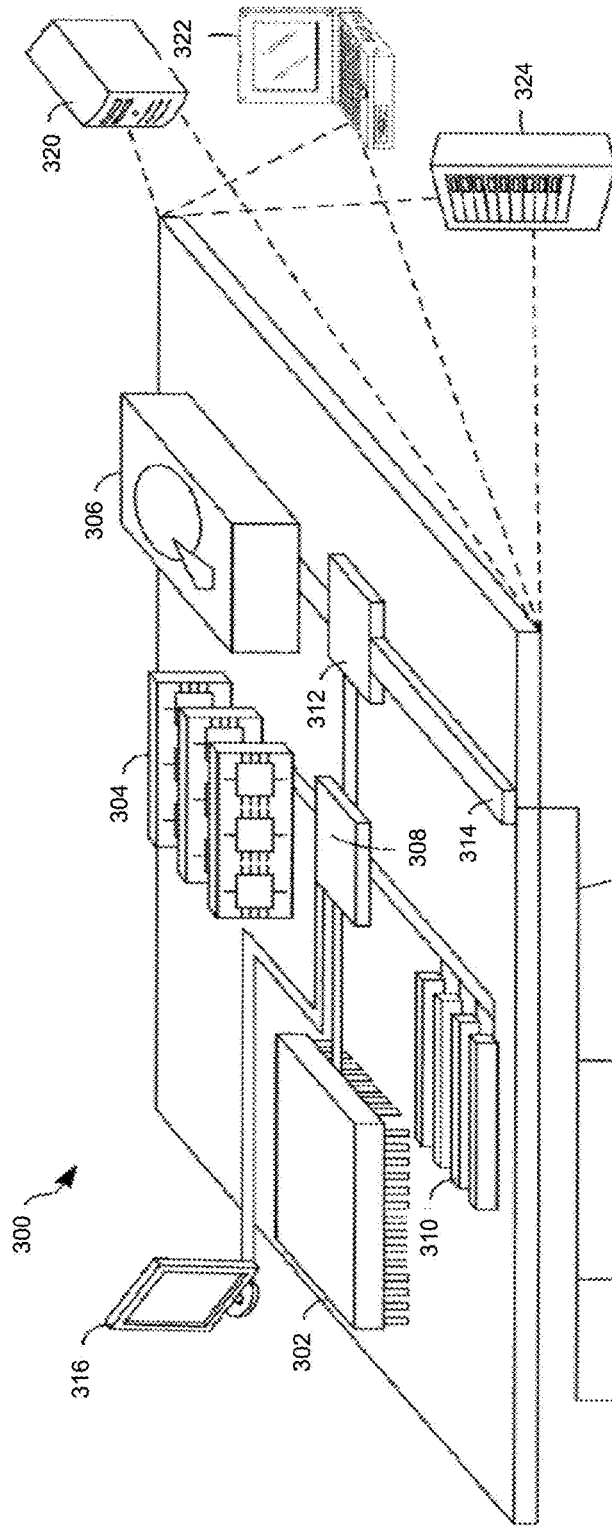
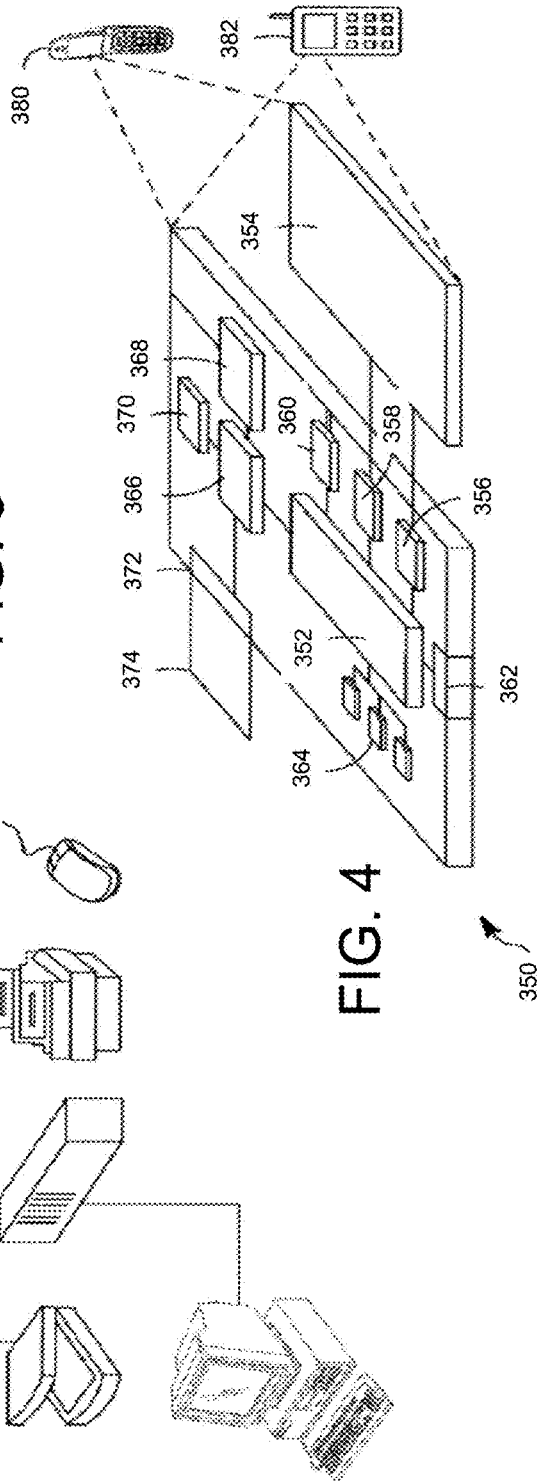
FIG. 3
FIG. 4

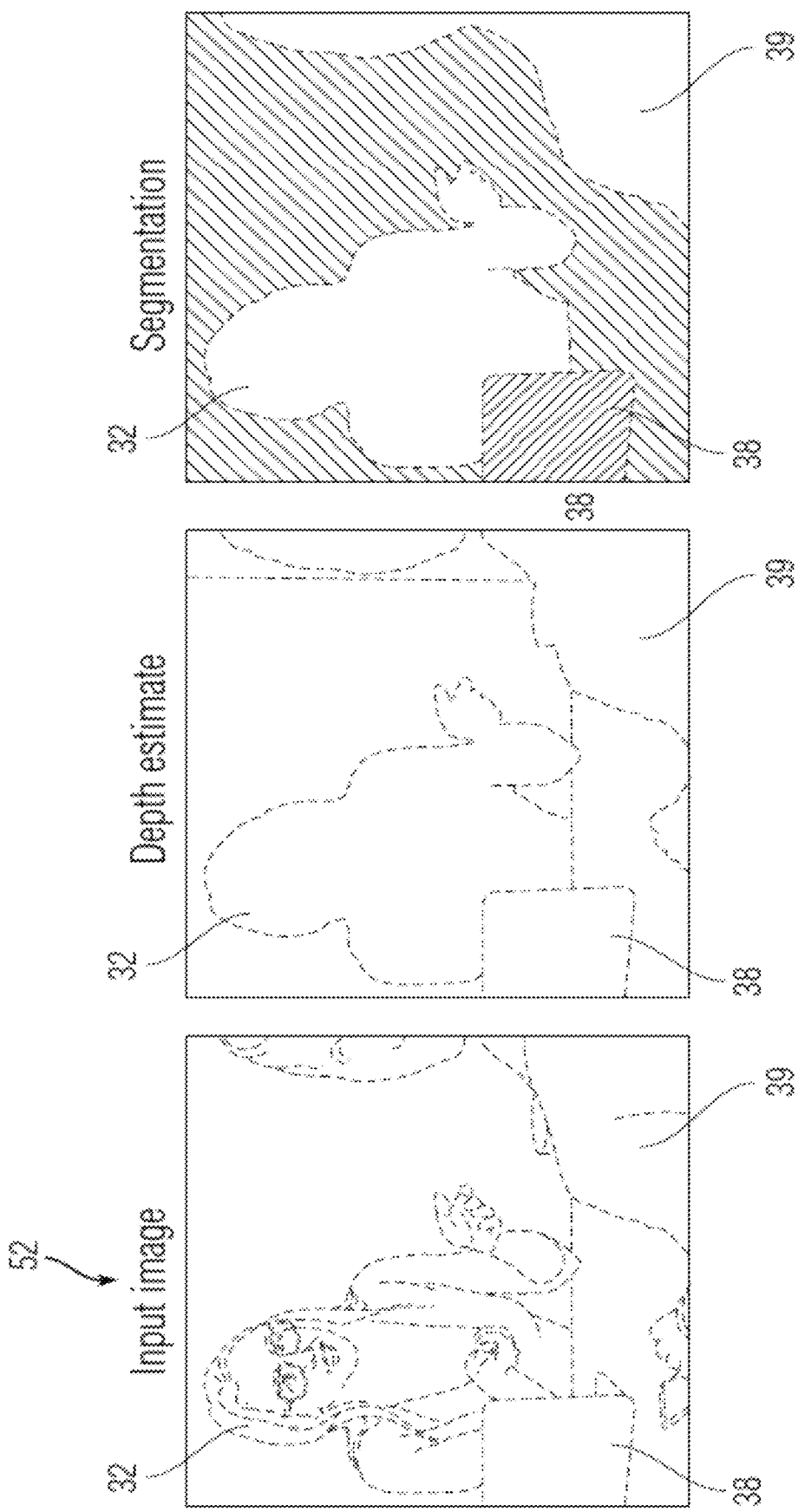

DISPLAY RESPONSIVE COMMUNICATION SYSTEM AND METHOD

CROSS-REFERENCE TO RELATED APPLICATIONS

This application is a continuation of U.S. patent application Ser. No. 17/009,194, filed on Sep. 1, 2020, which is a continuation-in-part of U.S. patent application Ser. No. 29/745,050, filed on Aug. 3, 2020, both of which are hereby incorporated by reference as if set forth in their entirety herein.

FIELD OF THE DISCLOSURE

The present disclosure relates to a communication system and method, and, more particularly, to a communication system and computer-implemented method that can analyze display content and selectively modify display properties of the content to enhance display effects.

BACKGROUND OF THE DISCLOSURE

In a computer networked environment such as the Internet, content providers typically supply content for display on end-user communication devices. The content generally includes images, text, video or audio. The content can be linked to webpages associated with the content providers. Frequently, the content includes image data that, when displayed on the end-user communication devices, lacks desired effects such as, for example, adequate depth perception or focus on a particular subject in the content. There exists a need for a technological solution that can analyze display content and selectively modify display properties to enhance one or more display effects.

SUMMARY OF THE DISCLOSURE

In some embodiments, aspects of the disclosure provide a technological solution that can analyze multimedia content and selectively modify display properties based on auxiliary display (AD) content to enhance one or more display effects. Some aspects of the disclosure includes a system and a computer-implemented method for analyzing the AD content and selectively modifying display properties to enhance display effect such as, for example, depth perception of an image, highlighting of a main subject of the image, and bringing together various portions of the AD content to display a unified and wholistic rendering of the AD content.

According to a nonlimiting embodiment, the system comprises a multimedia communication system for transmitting auxiliary display content to an end-user communication device to be rendered on a display device with a special effect to emphasize an image included in the auxiliary display content. The multimedia communication system comprises a processor that is arranged to: analyze image data included in an auxiliary display content; detect an object image or a background image in the auxiliary display content based on the analysis of the image data; determine a special effect based on the analysis of the image data; and apply the special effect to the auxiliary display content to modify display properties for the auxiliary display content such that the object image is emphasized or pops-out. The system can further comprise a transmitter arranged to send the auxiliary display content with modified display properties to an end-user communication device. The special effect can comprise a non-customization special effect, a simple foreground special effect or a selective foreground special effect.

In the multimedia communication system, the processor can be arranged to: generate or modify a multimedia content rendering application; and send the multimedia content rendering application to the end-user communication device, wherein the multimedia content rendering application is arranged to, when executed by a processor in the end-user communication device, render the auxiliary display content with modified display properties on a display device.

In the multimedia communication system, the non-customization special effect can comprise an overlay border that, when rendered by the end-user communication device, is displayed around an inner-border of an auxiliary display content display window on a display device.

In the multimedia communication system, the overlay border can have at least one corner and a non-overlay portion that emphasizes the object image in the auxiliary display content.

In the multimedia communication system, the simple foreground special effect can comprise an overlay border having an overlay portion and a non-overlay portion that, when rendered by the end-user communication device, is displayed as an overlay border atop of the background image in an auxiliary display content display window, with the object image being displayed without any overlay in the auxiliary display content display window.

In the multimedia communication system, the overlay border can have at least one corner and the non-overlay portion is rendered to emphasize the object image or an action depicted in the auxiliary display content.

In the multimedia communication system, the selective foreground special effect can comprise an overlay border having an overlay portion and a non-overlay portion that, when rendered by the end-user communication device, is displayed as an overlay border atop of the background image in an auxiliary display content display window, with at least a portion of the object image being displayed without any overlay in the auxiliary display content display window.

In the multimedia communication system, the selective foreground special effect can comprise a zoom-in or a zoom-out of the object image, or a blurring of the background image when rendered by the end-user communication device.

In the multimedia communication system, the selective foreground special effect can comprise a blurring of the background image.

In the multimedia communication system, the selective foreground special effect can comprise zooming-in or zooming-out the object image when rendered by the end-user communication device.

According to a further limiting embodiment, a computer-implemented method is provided for transmitting auxiliary display content to an end-user communication device to be rendered on a display device with a special effect to emphasize an image included in the auxiliary display content. The method can comprise: analyzing, by a processor, image data included in an auxiliary display content; detecting, by the processor, an object image and a background image in the auxiliary display content; determining, by the processor, a special effect based on the analysis of the image data; and applying, by the processor, the special effect to the auxiliary display content to modify display properties for the auxiliary display content to emphasize the object image, wherein the special effect comprises a non-customization special effect, a simple foreground special effect or a selective foreground special effect.

The method can further comprise: creating a multimedia content rendering application; and sending the multimedia content rendering application to an end-user communication device, wherein the multimedia content rendering application is arranged to, when executed by a processor in the end-user communication device, render the auxiliary display content with modified display properties on a display device.

In the method, the non-customization special effect can comprise an overlay border that, when rendered by an end-user communication device, is displayed around an inner-border of an auxiliary display content display window on a display device.

In the method, the overlay border can have at least one corner and a non-overlay portion that emphasizes the object image in the auxiliary display content.

In the method, the simple foreground special effect can comprise an overlay border having an overlay portion and a non-overlay portion that, when rendered by an end-user communication device, is displayed as an overlay border atop of the background image in an auxiliary display content display window, with the object image being displayed without any overlay in the auxiliary display content display window.

In the method, the overlay border can have at least one corner and the non-overlay portion is rendered to emphasize the object image or an action depicted in the auxiliary display content.

In the method, the selective foreground special effect can comprise an overlay border having an overlay portion and a non-overlay portion that, when rendered by an end-user communication device, is displayed as an overlay border atop of the background image in an auxiliary display content display window, with at least a portion of the object image being displayed without any overlay in the auxiliary display content display window.

In the method, the selective foreground special effect can comprise a zoom-in or a zoom-out of the object image when rendered by an end-user communication device.

In the method, the selective foreground special effect can comprise a blurring of the background image when rendered by the end-user communication device.

In the method, the selective foreground special effect can comprise zooming-in or zooming-out the object image when rendered by the end-user communication device.

Additional features, advantages, and embodiments of the disclosure may be set forth or apparent from consideration of the detailed description and drawings. Moreover, it is to be understood that the foregoing summary of the disclosure and the following detailed description and drawings provide nonlimiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure.

FIG. 3 is a block diagram depicting a nonlimiting embodiment of a content provider (CP) communication device.

FIG. 4 is a block diagram depicting a nonlimiting embodiment of the end-user communication device.

FIGS. 9-15 and 16A-16C are diagrams depicting additional examples of modifications of AD content performed by the overlay processor.

Figure 1:
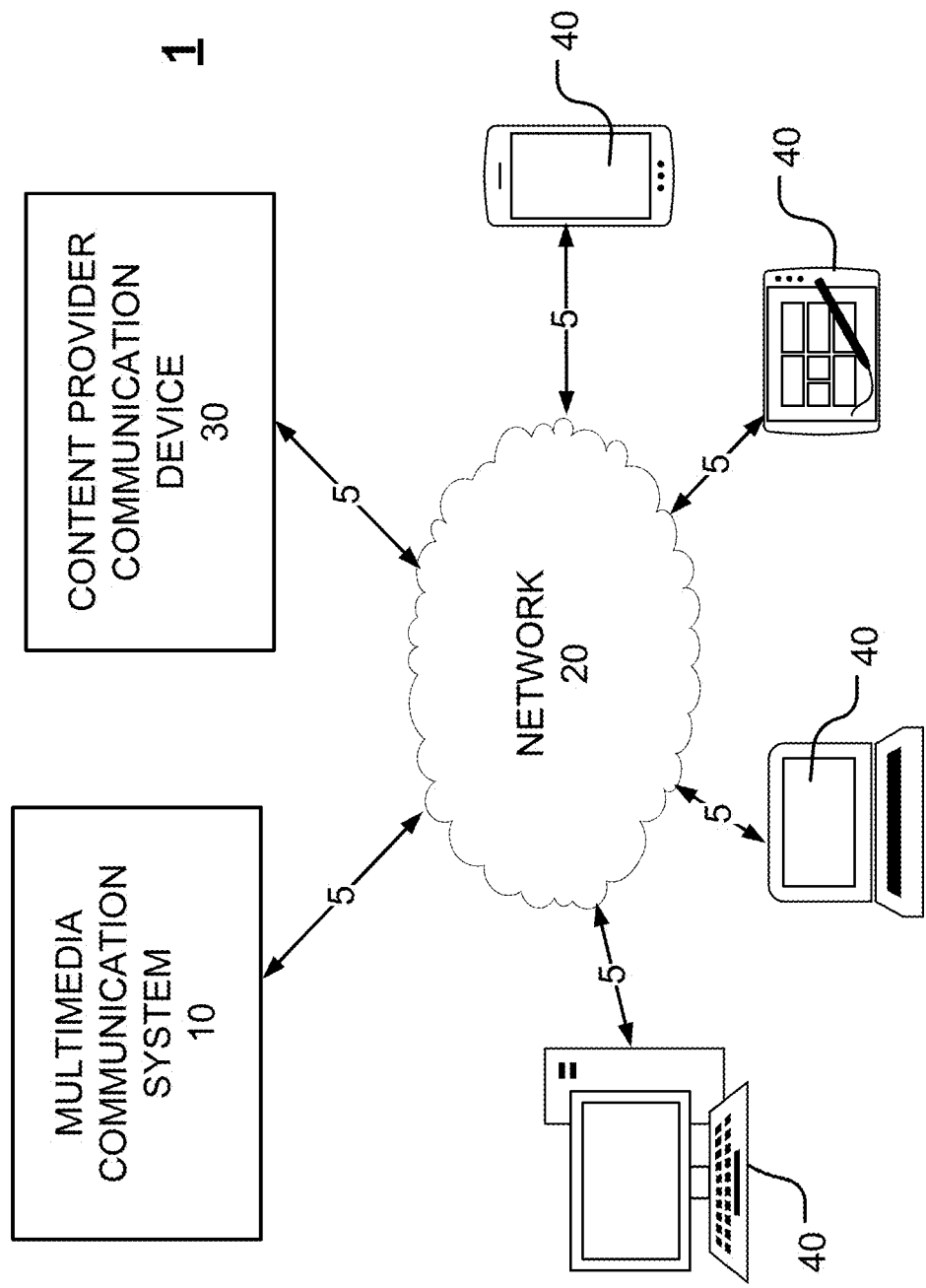
FIG. 1 is a block diagram depicting an implementation of a multimedia communication system in a user environment, arranged according to the principles of the disclosure.

The present disclosure is further described in the detailed description that follows.

DETAILED DESCRIPTION OF THE DISCLOSURE

The disclosure and its various features and advantageous details are explained more fully with reference to the non-limiting embodiments and examples that are described or illustrated in the accompanying drawings and detailed in the following description. It should be noted that features illustrated in the drawings are not necessarily drawn to scale, and features of one embodiment can be employed with other embodiments as those skilled in the art would recognize, even if not explicitly stated. Descriptions of well-known components and processing techniques may be omitted so as to not unnecessarily obscure the embodiments of the disclosure. The examples are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

FIG. 1 is a block diagram depicting an implementation of a multimedia communication system 10 in an environment 1, arranged according to the principles of the disclosure. The environment 1 can include a network 20, a content provider (CP) communication device 30 and one or more end-user communication devices 40, any or all of which can be coupled to each other directly or via the network 20 through one or more communication links 5.

The multimedia communication system 10 can include a computer, a server, a storage device, a database, an interface or a communication device. The multimedia communication system 10 can include a multimedia content modifier (MCM) system 100 (shown in FIG. 5). The multimedia communication system 10 can include the communication device architecture 300 (shown in FIG. 3) or 350 (shown in FIG. 4). The multimedia communication system 10 can be configured to provide multimedia content to the end-user communication devices 40. The multimedia content can include main display (MD) content and auxiliary display (AD) content that can be rendered on the end-user communication device 40. The AD content can be created, modified, or provided by the CP communication device 30. The AD content can be received by the end-user communication device 40 from the multimedia communication system 10 or CP communication device 30.

Figure 2:
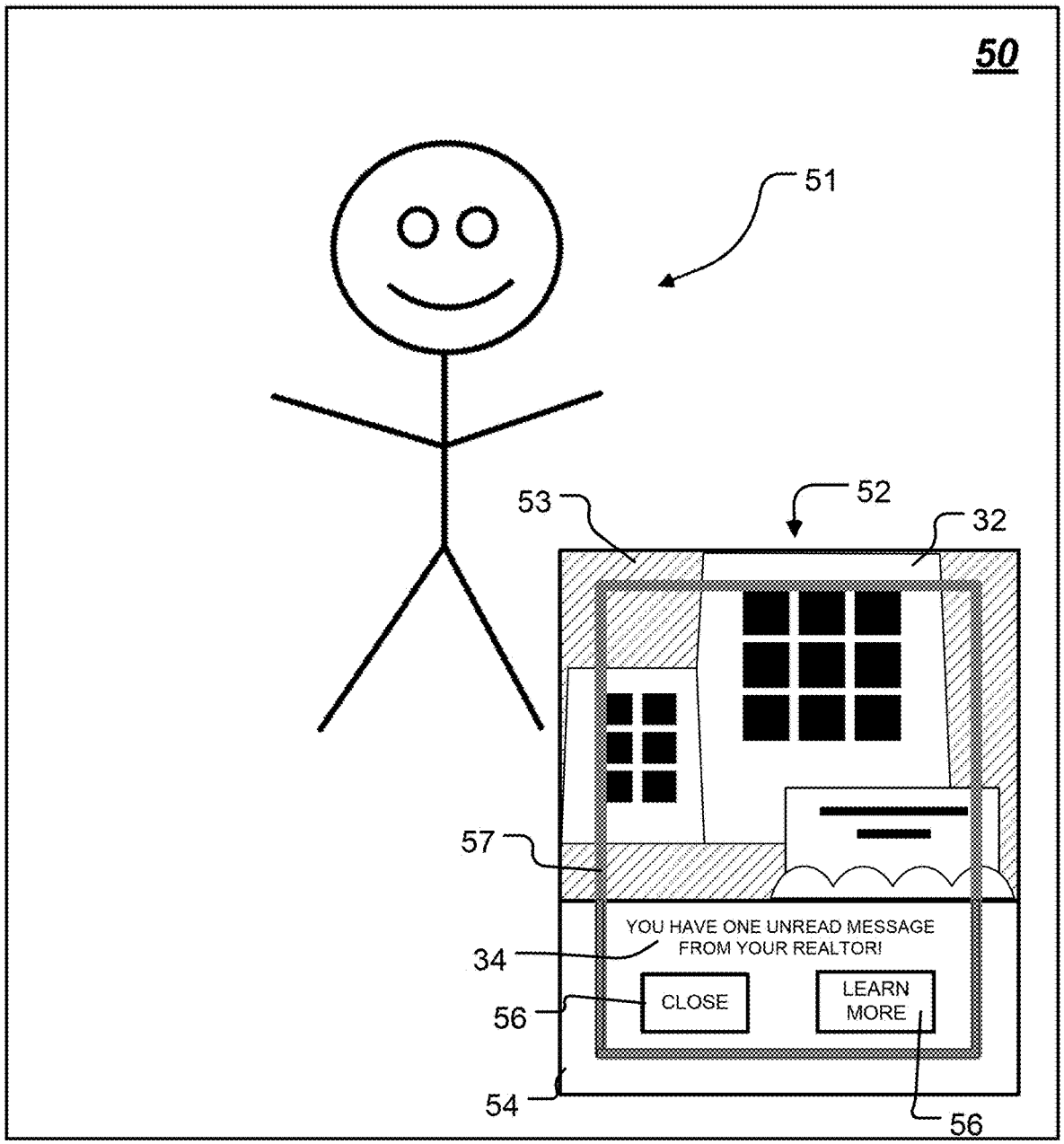
FIG. 2 shows a nonlimiting example of multimedia content that can be received by an end-user communication device and displayed on a display screen of the device.

FIG. 2 shows a nonlimiting example of the multimedia content that can be received by the end-user communication device 40 and displayed on a display screen 50 of a display device (for example, display device 354, shown in FIG. 4). In this nonlimiting example, the multimedia content includes main display (MD) content 51 and auxiliary display (AD) content 52. The multimedia content (including MD content and AD content) can be reproduced by the end-user communication device 40, for example, via a multimedia content rendering (MCR) application executed by a processor (for example, processor 352, shown in FIG. 4) in the device 40. The multimedia content can include any displayable or audible content that can be reproduced by the end-user communication device 40. The AD content 52 can be received without the MD content 51 and displayed on the end-user communication device 40, according to the principles of the disclosure.

The MCR application can be generated or modified by the multimedia communication system 10 and downloaded to each end-user communication device 40. The MCR application can include, for example, a browser application that can be installed and/or run on the end-user communication device 40. The MCR application can, when executed by the processor 352 (shown in FIG. 4), convert, for example, HyperText Markup Language (HTML), Cascading Style Sheets and JavaScript into a working website or webpage that can be interacted with by an operator of the end-user communication device 40, such as, for example, through a user interface.

The MD content 51 can include, for example, video/audio content, streaming video/audio content, or a webpage or website, or a results page or a landing page of a search operator.

The auxiliary display (AD) content 52 can include, for example, a content provider source identifier, text, an image, a logo, a video, a uniform resource locator (URL) address, or a sound. The AD content 52 can include, for example, an advertisement, a pop-up or pop-out advertisement, a message, a picture-in-picture image or message, a banner advertisement or any other content that can be included in, superimposed onto or reproduced (including displayed) with the MD content 51, or rendered or displayed by itself on the end-user communication device 40, without the MD content 51.

In the nonlimiting example shown in FIG. 2, the AD content 52 includes a pop-up or pop-out advertisement that includes an image 32 of a building structure and a textual message 34 relating to the image 32. The AD content 52 can include instructions and data that, when executed by the processor 352 (shown in FIG. 4), cause the end-user communication device 40 to render the AD content 52 on the display screen 50 of the display device 352 (shown in FIG. 4). The AD content 52 can include instructions to display the AD content 52 in two or more display regions 53, 54. The display region 52 can include the image data in the AD content, such as, for example, the image 32 with background; and, the display region 54 can include the non-image data in the AD content, such as for example, the textual message 34 and one or more call-to-action selectors 56. The AD content 52 can include instructions and data to render a special effect 57, which can include, for example, a border effect. For instance, the instructions and data can be configured to cause the end-user communication device 40 to render and display the special effect 57 as a border effect along an inner border of the AD content 52 (shown in FIG. 2), or another special effect such as, for example, a blurring effect, a rotating circle, a zoom-in effect, a zoom-out effect, a fade-in or a fade-out effect, or any other effect that might emphasize, highlight or "bring-to-life" the main subject (for example, image 32, shown in FIG. 2) in the AD content.

As seen in FIG. 2, the AD content can include instructions and data to render one or more call-to-action selectors 56 on the display screen 50. In a nonlimiting embodiment, a portion of the image 32 or textual message 34 can include a call-to-action. The selector 56 can include a radio button, a hyperlink, or a selectable item that can trigger or initiate a call-to-action by the end-user communication device 40, such as, for example, to access a file or a particular website or webpage on the Internet. The call-to-action selector 56 can be linked to a webpage or a website belonging to the content provider, which can be hosted, for example, by the multimedia communication system 10 or the CP communication device 30 (shown in FIG. 1).

The AD content can include instructions (and data) that, when executed by the processor 352 (shown in FIG. 4), causes the end-user communication device 40 to render the special effect 57, including, for example, an overlay having a predetermined shape, size, texture, color or location, or another special effect such as, for example, the blurring effect, rotating circle, zoom-in effect, zoom-out effect, fade-in effect, or fade-out effect, among others, that can emphasize or highlight the main subject (for example, image 32, shown in FIG. 2) in the AD content.

In the nonlimiting example seen in FIG. 2, the special effect 57 includes a gray-colored rectangular shape border overlay located within the perimeter of the displayed AD content 52. However, the special effect 57 can include a circle, oval, triangle or any other shape that can emphasize or "bring-to-life" the subject (for example, image 32, shown in FIG. 9). Moreover, the special effect 57 can be animated, such as, for example, a spinning circle (not shown), or portions of the image content (for example, image 32) can be zoomed-in, zoomed-out, blurred, brought into focus, vibrated, or otherwise manipulated to grab the user's attention when viewing the display on the end-user communication device 40. The layout of the display regions 53, 54 or special effect 57 can be arranged to emphasize the image 32, textual message 34 and call-to-action 56, as these are likely to be "clicked" by users.

Referring to FIG. 1, the multimedia communication system 10 (or CP communication device 30) can include a search engine server of a search engine operator that operates a search engine website. The MD content 51 (shown in FIG. 2) of a search engine webpage, such as, for example, a search results webpage or a landing webpage, can include the results of a search or the landing webpage displayed with the AD content 52 included, such as, for example, in a content slot on the search results webpage or landing webpage.

The CP communication device 30 can include the communication device architecture 300, shown in FIG. 3. The CP communication device 30 can include the MCM system 100, shown in FIG. 5. The CP communication device 30 can be operated, for example, by a content provider, to create, modify or provide AD content to be reproduced by the end-user communication devices 40.

FIGS. 3 and 4 show nonlimiting examples of a communication device architecture 300 and 350, respectively, including associated computing resource assets that can be used to implement the systems and methods described herein. The communication device architecture 300 (or 350) can be included in the CP communication device 30 (shown in FIG. 1); and, the communication device architecture 350 (or 300) can be included in the end-user communication device 40 (shown in FIG. 1). The computing resource assets shown here, their connections and relationships, and their functions, are meant to be exemplary only, and are not meant to limit implementations of the disclosure.

The communication device architecture 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. The processor 302 can process instructions for execution within the CP communication device 30, including instructions stored in the memory 304 or on the storage device 306 to display graphical information for a graphic user interface (GUI) on an external input/output device, such as display 316 coupled to high speed interface 308. In other implementations, multiple processors and/or multiple buses can be used, as appropriate, along with multiple memories and types of memory. Also, CP communication devices 30 can be connected, with each device providing portions of the necessary operations (for example, as a server bank, a group of blade servers, or a multi-processor system).

The memory 304 stores information within the CP communication device 30. In one implementation, the memory 304 is a volatile memory unit or units. In another implementation, the memory 304 is a non-volatile memory unit or units. The memory 304 can also be another form of computer-readable medium, such as a magnetic or optical disk.

The storage device 306 is capable of providing mass storage for the CP communication device 30. In one implementation, the storage device 306 can be or contain a computer-readable medium, such as a floppy disk device, a hard disk device, an optical disk device, or a tape device, a flash memory or other similar solid-state memory device, or an array of devices, including devices in a storage area network or other configurations. A computer program product can be tangibly embodied in a non-transitory computer-readable medium. The computer program product can contain instructions that, when executed, perform one or more methods, such as those described above. The computer-readable medium can include an information carrier such as the memory 304, the storage device 306, or memory on processor 302.

The high-speed controller 308 manages bandwidth-intensive operations for the CP communication device 30, while the low speed controller 312 manages lower bandwidth-intensive operations. Such allocation of functions is exemplary only. In one implementation, the high-speed controller 308 is coupled to memory 304, display 316 (for example, through a graphics processor or accelerator), and to high-speed expansion ports 310, which may accept various expansion cards (not shown). In the implementation, low-speed controller 312 is coupled to storage device 306 and low-speed expansion port 314. The low-speed expansion port, which may include various communication ports (for example, USB) may be coupled to one or more input/output devices, such as a keyboard, a pointing device, a scanner, or a networking device such as a switch or router, for example, through a network adapter.

The CP communication device 30 can be implemented in a number of different forms, as seen in FIG. 3. For example, it can be implemented as a standard server 320, or multiple times in a group of such servers. It can also be implemented as part of a rack server system 324. In addition, it can be implemented in a personal computer such as a laptop computer 322. Alternatively, computing resource assets from the CP communication device 30 can be combined with other computing resource assets in a mobile device, such as the end-user communication device 40. Each of such devices can contain one or more of the devices 30, 40, and an entire system may be made up of multiple devices 30, 40 communicating with each other through communication links.

As seen in FIG. 4, the communication device architecture 350 includes a processor 352, memory 364, an input/output device such as a display 354, a communication interface 366, and a transceiver 368, among other computing resource assets. The device architecture 350 can also be provided with a storage device, such as a microdrive or other device, to provide additional storage. Each of the computer resource assets 352, 364, 354, 366, and 368, are interconnected using various communication links, buses, and several of the computing resource assets can be mounted on a common motherboard or in other manners as appropriate.

The processor 352 can execute instructions within the end-user communication device 40, including instructions stored in the memory 364. The processor can be implemented as a chipset of chips that include separate and multiple analog and digital processors. The processor can provide, for example, for coordination of the other computing resource assets of the device 40, such as control of user interfaces, applications run by device 40, and wireless communication by device 40.

Processor 352 can communicate with a user through control interface 358 and display interface 356 coupled to a display 354. The display 354 can be, for example, a TFT LCD (Thin-Film-Transistor Liquid Crystal Display) or an OLED (Organic Light Emitting Diode) display, or other appropriate display technology. The display interface 356 can comprise appropriate circuitry for driving the display 354 to present graphical and other information to a user. The control interface 358 can receive commands from a user and convert them for submission to the processor 352. In addition, an external interface 362 can be provided in communication with processor 352, so as to enable near area communication of device 40 with other devices. External interface 362 can provide, for example, for wired communication in some implementations, or for wireless communication in other implementations, and multiple interfaces can also be used.

The memory 364 stores information within the end-user communication device 40. The memory 364 can be implemented as one or more of a computer-readable medium or media, a volatile memory unit or units, or a non-volatile memory unit or units. Expansion memory 374 can also be provided and connected to device 40 through expansion interface 372, which can include, for example, a SIMM (Single In Line Memory Module) card interface. Such expansion memory 374 can provide extra storage space for device 40, or can also store applications or other information for device 40. Specifically, expansion memory 374 can include instructions to carry out or supplement the processes described above, and can include secure information also. Thus, for example, expansion memory 374 can be provided as a security module for device 40, and can be programmed with instructions that permit secure use of device 40. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352, which can be received, for example, over transceiver 368 or external interface 362.

The end-user communication device 40 can communicate wirelessly through communication interface 366, which can include digital signal processing circuitry where necessary. Communication interface 366 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 368. In addition, short-range communication can occur, such as using a BLUETOOTH, WiFi, or other such transceiver (not shown). In addition, GPS (Global Positioning System) receiver module 370 can provide additional navigation- and location-related wireless data to device 40, which can be used as appropriate by applications running on device 40.

The end-user communication device 40 can also communicate audibly using audio codec 360, which can receive spoken information from a user and convert it to usable digital information. Audio codec 360 can likewise generate audible sound for a user, such as through a speaker, for example, in a handset of device 40. Such sound can include sound from voice telephone calls, can include recorded sound (for example, voice messages, music files, etc.) and can also include sound generated by applications operating on device 40.

The communication device architecture 300 can be implemented in a number of different forms, as shown in FIG. 3. For example, it can be implemented as a cellular telephone 380. It can also be implemented as part of a smart phone 382, personal digital assistant, or other similar mobile device.

Referring to FIGS. 1 and 4, the end-user communication device 40 can be arranged to communicate via the network 20 and to display data such as the multimedia content on the display screen 50 of the display device 354 (shown in FIG. 4). Using the user interface on the end-user communication device 40, a user can submit requests to receive multimedia content. The requests can be requests to a search engine and the requests can include search queries. In some implementations, the requests can include a request to access a webpage or website. The multimedia content can be received by the end-user communication device 40 from the multimedia communication system 10. The received multimedia content can include AD content, which may have originated from the CP communication device 30.

The end-user communication device 40 can reproduce the multimedia content on the display device 352 (shown in FIG. 4), including any AD content that might have been included in the multimedia content. For instance, the end-user communication device 40 can display the MD content 51 (shown in FIG. 2) or a results webpage or a landing webpage (not shown), filling one or more content slots in or on the MD content with the AD content 52 (shown in FIG. 2). The AD content 52 can be displayed by itself, without the MD content 51. The content slots can be dynamic and can be automatically adjusted in terms of position, layout, shape, or size on the display screen 50 (shown in FIG. 2). The MCR application can be stored in the multimedia communication system 10, in the end-user communication device 40, or elsewhere in the environment 1.

The MCR application can include markup language annotations for identifying content and creating structured documents, including images, text, links, sounds, and other objects. The markup language annotations can include a plurality of tags for displaying multimedia content, including, for example, the MD content 51 and/or AD content 52 (shown in FIG. 2) on the display screen 50 of the end-user communication device 40. The markup language can include, for example, Standard Generalized Markup Language (SGML), Scalable Vector Graphics (SVG), HTML, Extensible Markup Language (XHTML or XML), XML User Interface Language (XUL), or LaTeX. The markup language annotations can be provided as a markup language file that can be executed by, for example, a web browser running in the end-user communication device 40 to render the multimedia content on the display device 354 (shown in FIG. 4). The MCR application can include the web browser. Alternatively, the web browser can include the MCR application.

The MCR application can include style sheet language annotations for providing rules for stylistics and for describing the presentation of the content and document with the markup language annotations, such as, for example, the markup language file. The style sheet language annotations can include, for example, colors, fonts, layouts, and other stylistic properties. The style sheet language can include, for example, CSS, Document Style Semantics and Specification Language (DSSSL), or Extensible Stylesheet Language (XSL). The style sheet language annotations can be provided as a style sheet language file. Alternatively, the style sheet language annotations can be incorporated into the file containing the markup language annotations.

The MCR application can include scripting language instructions to create interactive effects related to the markup language annotations or style sheet language annotations. The scripting language can include, for example, Bash (for example, for Unix operating systems), ECMAScript (or JavaScript) (for example, for web browsers), Visual Basic (for example, for Microsoft applications), Lua, or Python. The scripting language instructions can include instructions that when executed by, for example, the web browser on the end-user communication device 40 effect rendering of multimedia content, as seen in the Figures, including, for example, FIG. 2, 7 or 9-15, on the display device 354 (shown in FIG. 4). The scripting language instructions can be provided as a scripting language file. Alternatively, the scripting language instructions can be incorporated into the file containing the markup language annotations.

The MCR application can include a document object model (DOM) such as for HTML or XML (for example, DOM5 HTML) that can create object-oriented representations of the content or documents that can be modified with the scripting language instructions. A DOM includes a cross-platform and language-independent convention for representing and interacting with objects in HTML, XHTML/XML, SGML, SVG, or XUL. As used herein, a document can refer to the DOM's underlying document.

The MCR application can be configured to be executable by the processor 352 (shown in FIG. 4) and can follow a model-view-controller (MVC) design pattern for user interfaces. According to the MVC design pattern, an application can be divided into three areas of responsibility, including: (1) the Model, which includes the domain objects or data structures that represent the application's state; (2) the View, which observes the state and generates an output to the users; and, (3) the Controller, which translates user input into operations on the model.

Figure 5:
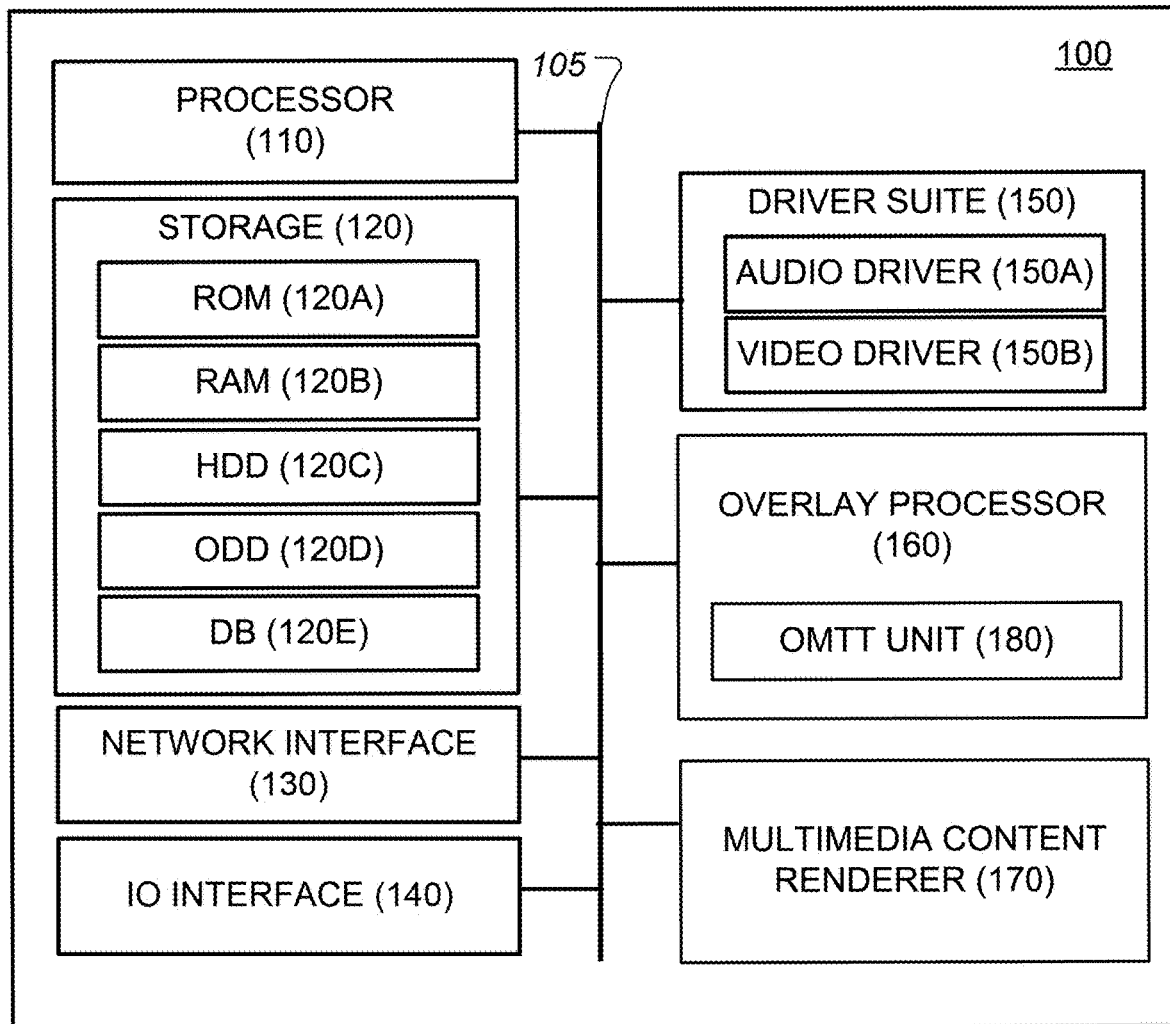
FIG. 5 is a block diagram depicting a nonlimiting embodiment of a multimedia content modifier (MCM) system.

FIG. 5 is a block diagram depicting a nonlimiting embodiment of the multimedia content modifier (MCM) system 100, constructed according to the principles of the disclosure. The MCM system 100 can be configured to implement the various aspects of the embodiments described. The MCM system 100 can be included in any one or more of the multimedia communication system 10, CP communication device 30 or end-user communication devices 40. The MCM system 100 can include (or can be included in) the communication device architecture 300 (shown in FIG. 3) or 350 (shown in FIG. 4). The MCM system 100 can include a suite of computer resources 130 to 180 that can be download to and/or installed on the multimedia communication system 10, or the end-user communication devices 40.

A nonlimiting embodiment of the disclosure can include the MCM system 100, which can be arranged to create or modify AD content to enhance the depth perception of an image, highlight the main subject of the image and to bring together the lower part of an AD content format (with the text and call to action) and an upper part with brand or other source identifier information and the image. Through creation or modification of the AD content, image rendering can be provided that improves visibility and/or recognizability of AD content on the end-user communication device 40, including making it easier for a user to identify and effectively select a call-to action selector 56. The display of images can be enhanced in or by the AD content to make an action or an object "pop-out" to the user.

Figure 9:
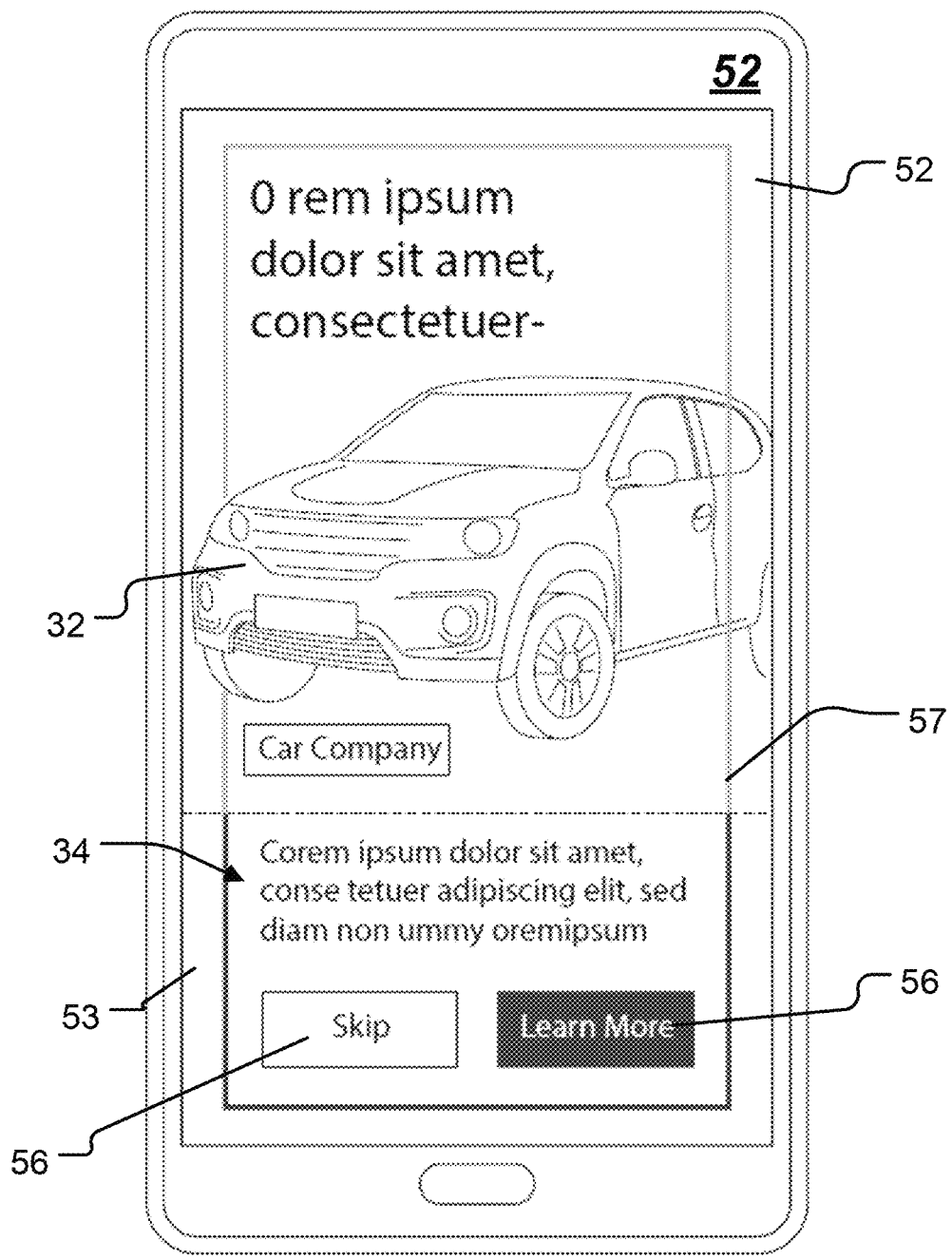
Figure 10:
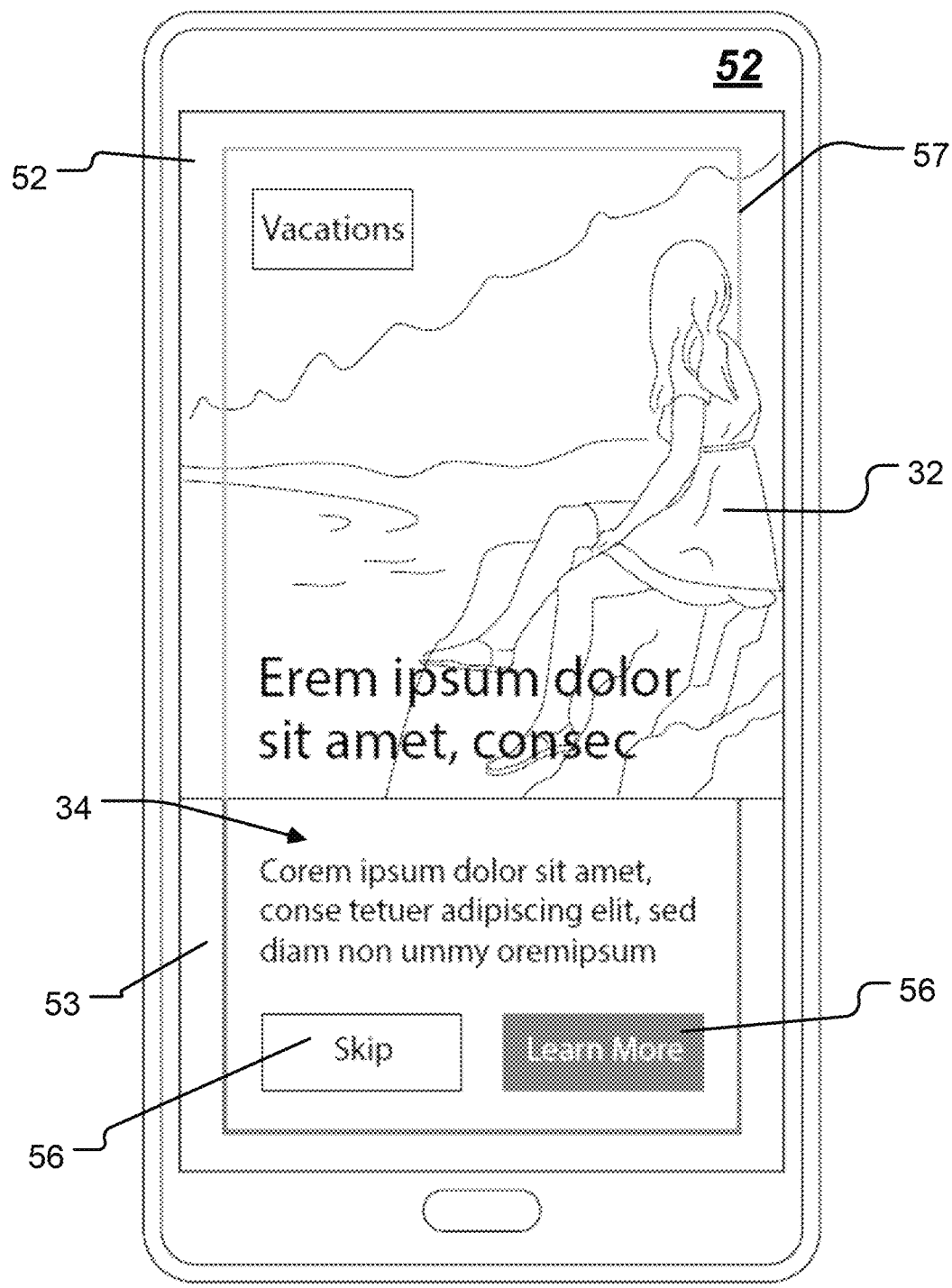
Figure 11:
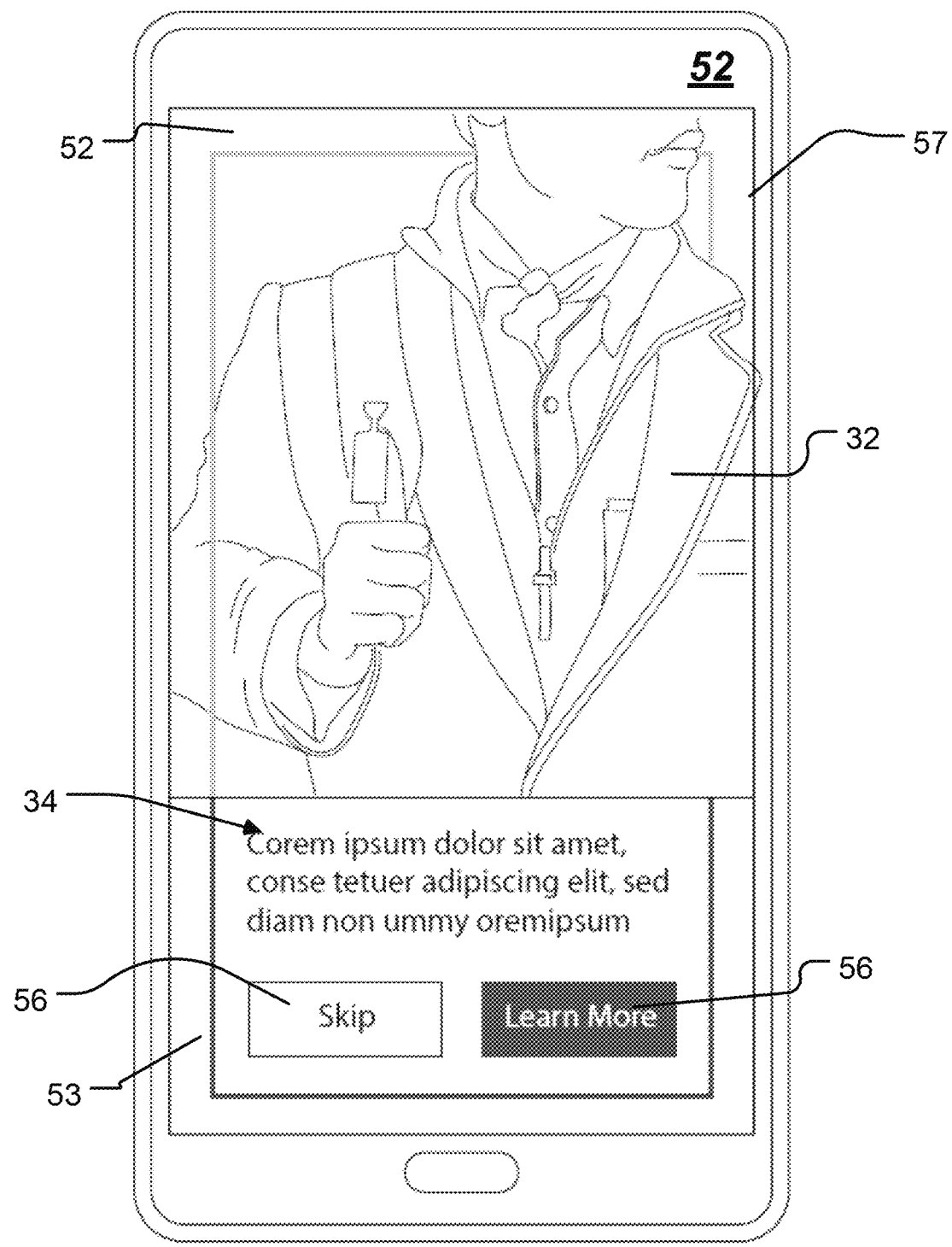

For instance, a special effect can be implemented such as a smart border in the AD content via the MCM system 100, such that, for example: (1) it doesn't modify a border if there isn't enough border to show; (2) doesn't overlay human faces; (3) doesn't overlay featured products; (4) enhances depth by selectively overlaying the border on part of the scene, subject or product; (5) enhances the scene action or movement by taking into consideration the orientation of the action displayed (for example, car going from right to left, as seen in FIG. 9). The MCM system can be arranged to implement other special effects such as zoom-in/out, blurring, or other image manipulation to emphasize the main subject, for example, as seen in FIG. 11.

The MCM system 100 includes an overlay processor 160, which can include a machine learning (ML) platform. The MCM system can include a processor 110, a storage 120, a network interface 130, an input-output (IO) interface 140, a driver suite 150, or a multimedia content renderer 170. The MCM system 100 can include an overlay model training and tuning (OMTT) unit 180. The overlay processor 160 and OMTT unit 180 can be comprised in a single computing resource asset, as seen in FIG. 5, or provided as separate computing resource assets (not shown).

The MCM system 100 can include a bus 105, which can be connected to any or all of the computer resource assets 110 to 180 by communication links. The bus 105 can be connected to the architectures 300 or 400 (shown in FIGS. 3 and 4).

Any one or more of the computing resource assets 110 to 180 can include a unique and separate computing device, as seen in FIG. 5, or two or more of the computing resource assets can be integrated or integratable as a single computing device. Any of the computing resource assets 120 to 180 can include a computer resource that can be executed on the processor 110 as one or more computing resource processes. The computer resources can be contained in the storage 120.

The bus 105 can include any of several types of bus structures that can further interconnect to a memory bus (with or without a memory controller), a peripheral bus, and a local bus using any of a variety of commercially available bus architectures.

The processor 110 can include any of various commercially available processors. The processor 110 can include a computing device. Dual microprocessors and other multiprocessor architectures can be employed as the processor 110. The processor 110 can include a central processing unit (CPU) or a graphic processing unit (GPU). The processor 110 can be arranged to interact with any of the computer resource assets 120 to 180 to carry out or facilitate with the processes described herein. The processor 110 can be further arranged to interact with the computer resource assets in the architectures 300 and 400 (shown in FIGS. 3 and 4).

The storage 120 can include a read-only memory (ROM) 120A, a random-access memory (RAM) 120B, a hard disk drive (HDD) 120C, an optical disk drive (ODD) 120D, and a database (DB) 120E. The storage 120 can provide non-volatile storage of data, data structures, and computer-executable instructions, and can accommodate the storage of any data in a suitable digital format.

The storage 120 can include a computer-readable medium that can hold executable or interpretable computer code (or instructions) that, when executed by the processor 110, cause the steps, processes and methods in this disclosure to be carried out. The computer-readable medium can be contained in the HDD 120C or ODD 120D. The computer readable medium can include sections of computer code that, when executed by the processor 110, cause the MCM system 100 to analyze display content, identify objects (for example, people, animals, or products) and things (for example, background, or scenery), and create or apply a special effect (for example, special effect 57, shown in FIG. 9) based on the display content, for example, such that an object is perceived by a user of the end-user communication device 40 or creates a perception that the object is popping out of the display content or coming to life. The MCM system 100 can modify display properties for the display content such that, for example, the image of the object zooms in or out, so as to emphasize the object or make it a focal point in the display content.

A basic input-output system (BIOS) can be stored in the non-volatile memory 120A, which can include, for example, a ROM, an erasable programmable read-only memory (EPROM), or an electrically erasable programmable read-only memory (EEPROM). The BIOS can contain the basic routines that help to transfer information between any one or more of the computing resource assets 110 to 180 in the system 100, such as during start-up.

The RAM 120B can include dynamic random-access memory (DRAM), a synchronous dynamic random-access memory (SDRAM), a static random-access memory (SRAM), or another high-speed RAM for caching data.

The HDD 120C can include, for example, an enhanced integrated drive electronics (EIDE) drive, a serial advanced technology attachments (SATA) drive, or any suitable hard disk drive for use with big data. The HDD 120C can be configured for external use in a suitable chassis (not shown).

The ODD 120D can be arranged to read or write from or to a compact disk (CD)-ROM disk (not shown), or, read from or write to other high capacity optical media such as a digital versatile disk (DVD).

The HDD 120C or ODD 120D can be connected to the bus 105 by a hard disk drive interface (not shown) and an optical drive interface (not shown), respectively. The hard disk drive interface (not shown) can include a Universal Serial Bus (USB) (not shown), an IEEE 1394 interface (not shown), and the like, for external applications.

The DB 120E can store training datasets and testing data sets, for example, for an overlay model used by the machine learning platform in the overlay processor 160. The training datasets can be updated periodically (or continuously) with updated parametric values, such as, for example, during parametric tuning of the overly model.

Any number of computer resources can be stored in the storage 120, including, for example, a program module, an operating system, an application program, an application program interface (API), or program data. The computing resource can include an API such as, for example, a web API, a simple object access protocol (SOAP) API, a remote procedure call (RPC) API, a representation state transfer (REST) API, or any other utility or service API. Any (or all) of the operating system, application programs, APIs, program modules, and program data can be cached in the RAM 120B as executable sections of computer code.

The API can include an API for a markup language such as, for example, SGML, SVG, HTML, XHTML/XML), XUL, or LaTeX.

The API can include an API for a style sheet language, such as, for example, CSS, DSSSL, or XSL. The API can include a web-based API, an operating system API, a database system API, a computer hardware API, or a library API. The API can include, for example, one or more of the APIs available at <<https://developers.google.com>>.

The API can include one or more APIs that connect webpages to scripts or programming languages, including modelling (for example, SGML, SVG, HTML, XHTML/XML, XUL) documents as objects.

The API can include a document object model (DOM) API, such as for HTML or XML (for example, DOM5 HTML), that can create object-oriented representations of webpages that can be modified with a scripting module in the multimedia content renderer 170 (or overlay processor 160). A DOM can include a cross-platform and language-independent convention for representing and interacting with objects in HTML, XHTML/XML, SGML, SVG, or XUL.

The network interface 130 can be connected to the network 20 (shown in FIG. 1), which can include the Internet. The network interface 130 can include a wired or a wireless communication network interface (not shown) or a modem (not shown). When used in a local area network (LAN), the MCM system 100 can be connected to the LAN network through the wired or wireless communication network interface; and, when used in a wide area network (WAN), the MCM system 100 can be connected to the WAN network through the modem. The modem (not shown) can be internal or external and wired or wireless. The modem can be connected to the system bus 105 via, for example, a serial port interface (not shown). The network interface 130 can include a receiver (not shown), a transmitter (not shown) or a transceiver (not shown).

The input-output (10) interface 140 can receive commands or data from an operator via a user interface (not shown), such as, for example, a keyboard (not shown), a mouse (not shown), a pointer (not shown), a stylus (not shown), a microphone (not shown), a speaker (not shown), or a display device (not shown). The received commands and data can be forwarded from the IO interface 140 as instruction to data signals, via the bus 105, to any of the computer resource assets 110 to 180.

The driver suite 150 can include an audio driver 150A and a video driver 150B. The audio driver 150A can include a sound card, a sound driver (not shown), an interactive voice response (IVR) unit, or any other device necessary to render a sound signal on a sound production device (not shown), such as for example, a speaker (not shown). The video driver 150B can include a video card (not shown), a graphics driver (not shown), a video adaptor (not shown), or any other device necessary to render an image signal on a display device (not shown).

The overlay processor 160 can include a supervised machine learning platform or an unsupervised machine learning platform. The machine learning platform can include, for example, a Word2vec deep neural network, a convolutional architecture for fast feature embedding (CAFFE), an artificial immune system (AIS), an artificial neural network (ANN), a convolutional neural network (CNN), a deep convolutional neural network (DCNN), region-based convolutional neural network (R-CNN), you-only-look-once (YOLO), a Mask-RCNN, a deep convolutional encoder-decoder (DCED), a recurrent neural network (RNN), a neural Turing machine (NTM), a differential neural computer (DNC), a support vector machine (SVM), a deep learning neural network (DLNN), Naive Bayes, decision trees, logistic model tree induction (LMT), NBTree classifier, case-based, linear regression, Q-learning, temporal difference (TD), deep adversarial networks, fuzzy logic, K-nearest neighbor, clustering, random forest, rough set, or any other machine intelligence platform capable of supervised or unsupervised learning for analyzing and identify or predicting objects and things in multimedia content. The machine learning platform can include an overlay machine learning (ML) model (or overlay model) that can analyze image data in auxiliary display (AD) content, identify objects and things, and create or apply special effects to the AD content based on the image data in the AD content (for example, AD content 52, shown in FIG. 2).

The overlay processor 160 is arranged to receive AD content (for example, AD content 52, shown in FIG. 2). The overlay processor 160 can be arranged to parse the AD content from received multimedia content. The overlay processor 160 is arranged to analyze image data in the AD content, extract features, classify the extracted features, cluster or group results and identify (or predict) objects and background in the image data. The overlay processor 160 can be arranged to detect and analyze any existing special effects (for example, border, shown in FIG. 2) included in the AD content, or to create and apply the special effect to the AD content, depending on the identified (or predicted) objects or background. The overlay processor 160 is further arranged to create or modify the special effect and/or image data to emphasize, bring into the foreground or highlight the object (or background), for example, such that the object or foreground pops out or appears to come to life from the rest of the display content when rendered on the end-user communication device 40.

The overlay processor 160 can be arranged (for example, through training of the overlay model) to, among other things: not modify an existing special effect 57, such as, for example, when the special effect 57 includes an overlay border and a determination is made that there is insufficient overlay to be rendered on the display screen; not overlay objects (discussed below) that are to be emphasized, brought into the foreground or highlighted; enhance depth by rendering the special effect 57 on a part of the object or background (discussed below); and, enhance an action or movement in the AD content by analyzing and identifying (or predicting) the orientation of the action or movement displayed (for example, a car going from left to right, a human raising a hand, or a dog jumping). In this regard, the overlay model (for example, in the overlay processor 160) can be trained via the OMTT unit 180.

Figure 6:
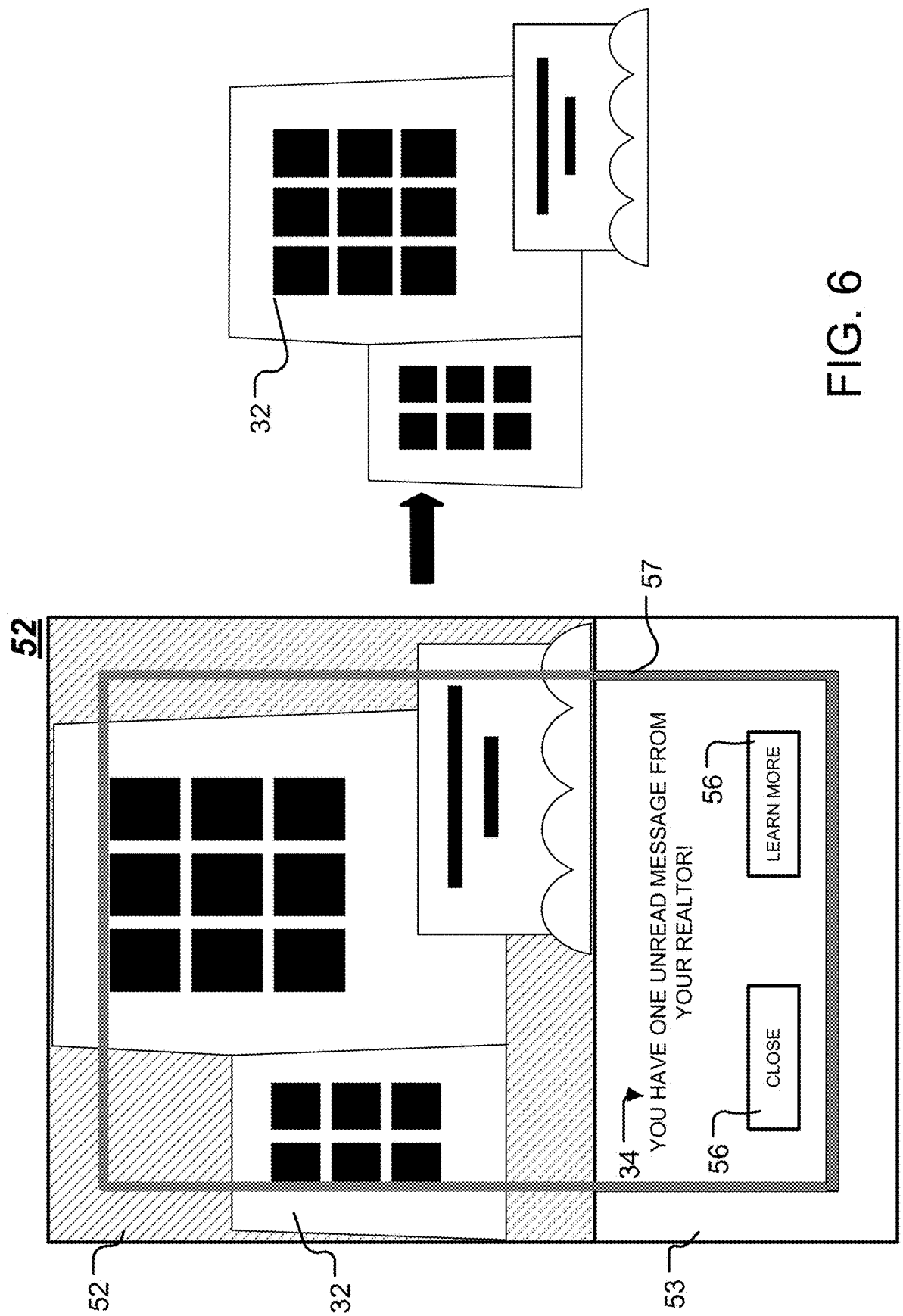
FIG. 6 is a diagram depicting a nonlimiting example of an operation of an overlay processor included in the MCM system, shown in FIG. 5.

FIG. 6 shows a nonlimiting example of an operation of the overlay processor 160 when provided with the AD content 52 (shown in FIG. 2). Here, the overlay processor 160 can analyze the image data in the AD content 52, including any existing special effects, and identify the object in the image 32 as a building structure. The overlay processor 160 can identify (or predict) each part of the object in the image 32, including a position and a directional orientation. The overlay processor 160 can identify (or predict) the edges and/or outlines of the object. The overlay processor 160 can be arranged to identify (or predict) any changes relating to the object as a function of time, including for example, motion, direction of motion, speed of motion. Simultaneously, the overlay processor 160 can identify (or predict) the background in the image data. Based on an analysis of the object and background, the overlay processor 160 can determine (or predict) an action in the AD content, such as, for example, a thing or a direction the object is point toward.

The object can include, for example, an animal, an article, a product, or any item that is to be emphasized, brought into the foreground or highlighted during rendering or display on the end-user communication device 40. The background can include any thing or things, other than the object, that can be deemphasized or played down during rendering or display on the end-user communication device 40. For instance, in the example shown in FIG. 6, the object is a building and the background is everything else surrounding the building.

Based on the identification (or prediction) of the object and/or background, the overlay processor 160 can create or modify a special effect to enhance the AD content to emphasize, highlight or otherwise draw attention to the image 34.

Figure 7:
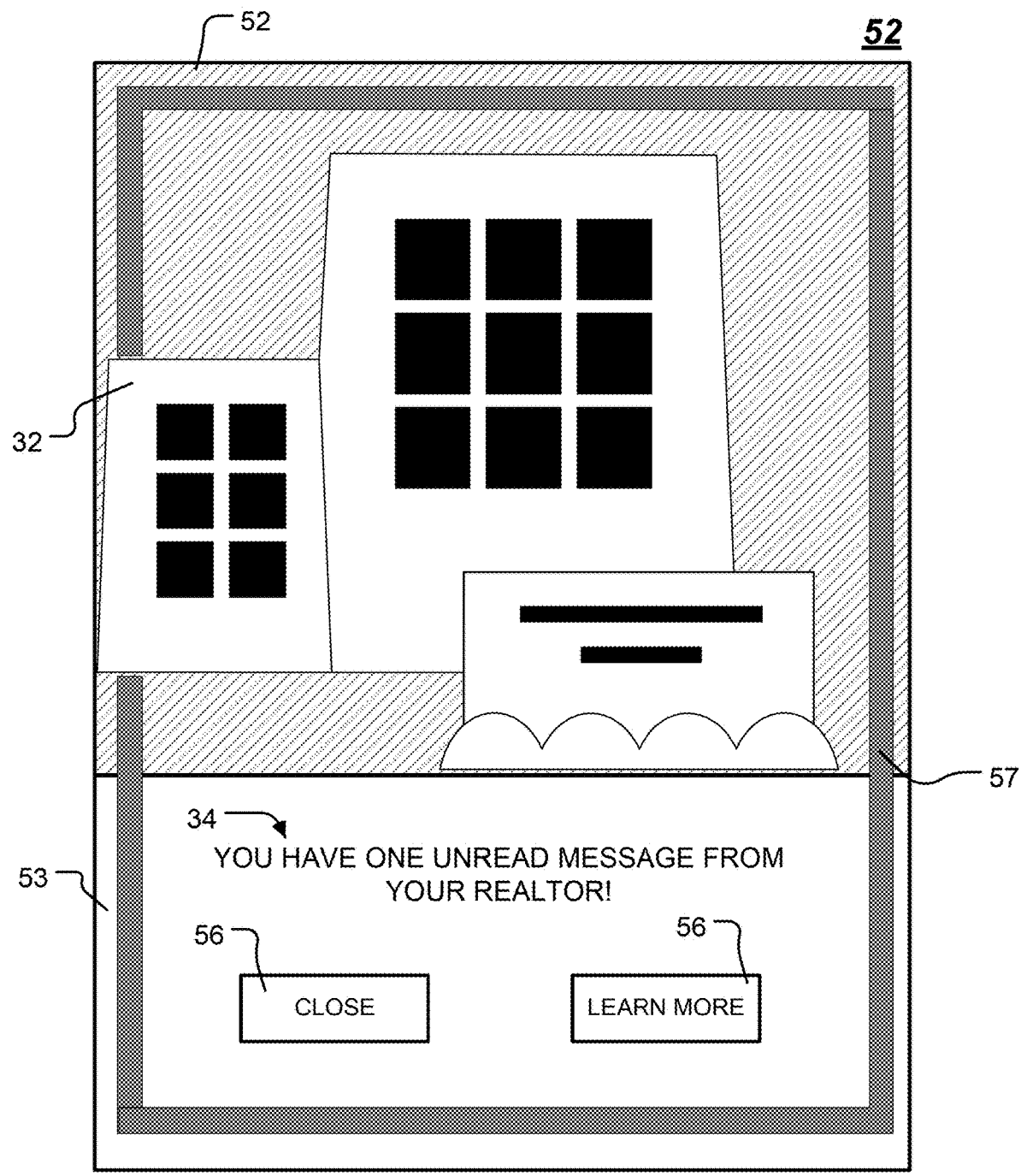
FIG. 7 is a diagram depicting a nonlimiting example of a modification of auxiliary display (AD) content performed by the overlay processor.

FIG. 7 shows a nonlimiting example of a modification of the AD content performed by the overlay processor 160. As seen, the special effect 57, which in this nonlimiting example is an overlay border, can be modified such that it does not overlay any part of the object in the image 32. In this example, the overlay processor 160 has also resized and/or repositioned the object such that the special effect 57 remains visible to emphasize the object, textual message 34 and call-to-action selectors 56.

Referring to FIG. 5, the overlay processor 160 can be arranged to analyze the image data in the AD content and determine (or predict) display variables of an object (or background) in the image data, such as, for example, size, position, outline, directional orientation, or any other attribute of the object that can be perceived or viewed when rendered on the display device 354 (shown in FIG. 4) of the end-user communication device 40. Based on the analysis of the image data and identification (or prediction) of the object and background, the overlay processor 160 can determine display properties for the special effect 57 to be rendered with the AD content on the display device 354 (shown in FIG. 4), such that the object (or background) is emphasized, brought to the foreground or highlighted. The display properties can include, for example, shape (for example, rectangle, square, oval, circle, triangle, box, sphere, pyramid, etc.), size (for example, height, width, depth, radius, etc.), color, contrast, brightness, shading, texture, or location, or image manipulation, such as, for example, zoom-in/out, blur/focus, or shake/vibrate of the image. The overlay model can be built, trained or tuned by the overlay model trainer 180.

The OMTT unit 180 can train the overlay model using annotated historical data, including the training dataset stored in the DB 120E, and tune the overlay model using the testing dataset stored in the DB 120E. The OMTT unit 180 can tune the overlay model during operation of the MCM system 100 by updating parametric values in the overlay model to, for example, minimize any differences between the overlay model predictions and actual, observed results.

In a nonlimiting embodiment the OMTT unit 180 can be arranged to interact with an operator (for example, via the IO interface 140, shown in FIG. 5) to create training datasets, or the OMTT unit 180 can be provided with a large training dataset of AD content, such as, for example, sets of tens, hundreds, thousands, hundreds of thousands, or more unique AD content records. Each AD content record can include image frame pixels that can be divided into a plurality image blocks, which each block corresponding to a unique region of the image frame, without any overlapping pixels. The image block can include, for example, a two-dimensional a×b array of pixels, where a is a number of pixels located consecutively along a row of image pixels and b is a number of pixels located consecutively along a column of image pixels, where a and b are positive integers greater than 1, and where a and b can have the same or different values. Alternatively, the image pixels in the image frame can be divided such that the image blocks have different dimensions from each other. The image block can be scaled such that it cannot comprise more than one object per image block. Each image block can include a unique address with respect to the image frame.

The OMTT unit 180 (shown in FIG. 5) can be arranged to receive object-, background- or special effect-specific parameters for each aberration, background, and special effect when creating a training dataset. The MCM system 100 can be arranged to allow a user to annotate AD content (for example, using a mouse or stylus) to mark a plurality of points on the display screen, which can then be used by the MCM system 100, for example, through interaction with the processor 110 (shown in FIG. 5), to calculate and determine object type, background type and special effect type, including shape, size dimensions, location, orientation, and display properties, such as, for example, color, texture, contrast, brightness, shading, etc. for each portion of the object, background and overlay.

The annotations made by the user for each AD content record can be communicated to the OMTT unit 180 (shown in FIG. 5), which can generate metadata for each AD content record, including the object, background and special effect for the image data. The annotations can be communicated to the OMTT unit 180 as label tuning commands, or stored in the storage 120 and associated with corresponding image blocks, which can also be stored in the storage 120. The metadata can be embedded in the image block data and stored as labeled image block data in the storage 120. The generated metadata can include indexing data for each object, background and special effect.

The training dataset, which includes an accumulation of labeled AD content records, can be used to create a training database in the DB 120D (shown in FIG. 5) or to augment an existing training dataset to train the overlay model in the overlay processor 160 (shown in FIG. 5) for improved performance.

All the image blocks in an AD content record can be rendered, for example, by the multimedia content renderer 170 (shown in FIG. 5) or the processor 352 (shown in FIG. 4), on a display device (for example, display device 354, shown in FIG. 4) to display the AD content. The multimedia content renderer 170 can include a computing device or, as previously noted, a computer resource that can be executed by the processor 110 (shown in FIG. 5) or the processor 352 (shown in FIG. 4).

The multimedia content renderer 170 can be arranged to create, configure, or update the MCR application. The MCR application can be created, configured or updated in the multimedia communication system 10 (shown in FIG. 1) and sent or downloaded to the end-user communication device 40. The multimedia content renderer 170 can include a scripting module that can provide a special run-time environment that can automate the execution of tasks in the MCM system 100. The scripting module can include one or more scripting languages, which can range from domain-specific languages to general-purpose languages, such as, for example, Bash (e.g., for Unix operating systems), ECMAScript (or JavaScript) (e.g., for web browsers), Visual Basic (e.g., for Microsoft applications), Lua, Python, and the like. The multimedia content renderer 170 can include one or more of the scripting modules found at, for example, <<https://developers.google.com/apps-script/>>.

The multimedia content renderer 170 can be configured to cause AD content or a webpage to be provided to the end-user communication device 40 that includes AD content (for example, AD content 52, shown in FIG. 2 or 7) and instructions (e.g., webpage code) that invoke a rendering script responsive to a request for the AD content or webpage on the end-user communication device 40. The rendering script can be downloaded from the multimedia content render 170 to the end-user communication device 40 and stored locally at the device, or it can be provided in real-time to the end-user communication device 40 with the webpage. The rendering script can be provided as part of the MCR application.

The overlay processor 160 and multimedia content renderer 170 can be arranged to interact with, for example, the processor 110, storage 120 or network interface 140, to receive and analyze multimedia content, including AD content. The multimedia content renderer 170 can be arranged to interact with the processor 110 or network interface 140 to send/receive multimedia content and/or the MCR application.

The MCR application can include computer executable code or instructions or sets of instructions that, when executed by the processor in the end-user communication device 40, causes the device 40 to render the display content, including a special effect customized to the AD content, for example, such that an object in the display content is emphasized or pops-out. The MCR application can include one or more rules for the display of the special effect on the end-user communication device 40, including, for example, one or more rules that define how the object and background are to be rendered by the end-user communication device 40.

For instance, the rules in the MCR application can define, when displaying the special effect, one or more colors, one or more textures, one or more sizes, or other effects that emphasize an object in the image data. The rules can further define, when rendering the special effect, one or more colors, one or more fonts, one or more textures, one or more sizes, or one or more layouts.

The MCR application can further include rules that define how an object or background is to be displayed on the end-user communication device 40, including, for example, dimensions, location and orientation.

The MCR application can include one or more rules that define the layout for rendering the AD content, with or without the main display content, on the end-user communication device 40.

In the case of HTML5, the MCR application can include an audio tag (e.g., an instruction to embed an audio file/link in the displayed screen and how to play it), a video tag (e.g., an instruction to embed video in the displayed screen and how to play it), a source tag (e.g., can be used with audio or video to identify a source for the audio or video), an embed tag (e.g., an instruction to embed specified media type for content that might lack support within other media elements), a canvas tag (e.g., an instruction to set aside part of the display screen), a svg tag (e.g., an instruction to embed vector graphics (e.g., object, text, overlay and/or background) encoded with SVG markup language, to allow graphics (e.g., objects, text, overlay and/or background) to be scaled dynamically to the area and shape of the display screen without losing any graphic quality), and the like. As understood by those skilled in the art, the MCR application can include other tags that, when referenced by, for example, a style sheet language, cause the end-user communication device 40 to render the AD content with or without the MD content, to have a location, layout, size, shape, color, texture, font, special effect, backdrop, and the like, that is optimal for the particular AD content and/or end-user communication device 40.

For instance, using the canvas tag in HTML5, a portion of a display screen on an end-user communication device 40 can be targeted for a content slot (or new canvas window) for insertion of the AD content 52 (shown in FIG. 7), including the height and width of the canvas which might be measured from an upper-left corner of the display screen. The canvas window should match the size of the AD content, including overlay 57.

Figure 8:
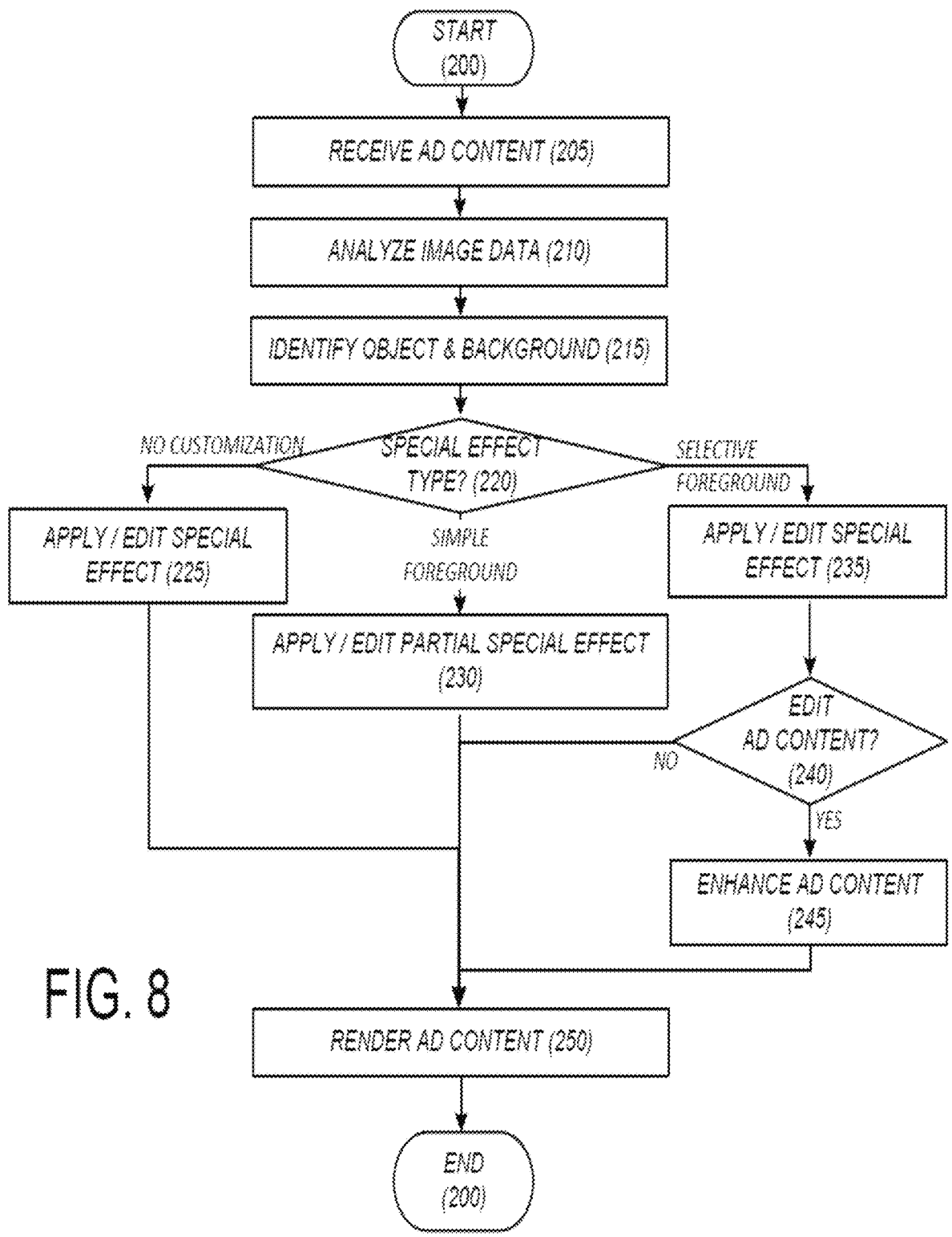
FIG. 8 is a diagram depicting a nonlimiting embodiment of a process for analyzing AD content and selectively modifying display properties based on image data in the AD content.

FIG. 8 shows a nonlimiting embodiment of a process 200 for analyzing AD content and selectively modifying display properties for the AD content based on image data included in the AD content. The process 200 can be performed by the MCM system 100 (shown in FIG. 5). The process 200 can be performed by the overlay machine learning model, which can be included in the MCM system 100 or downloaded to and installed on, for example, the end-user communication device 40 (shown in FIG. 1). As previously noted, the MCM system 100 (shown in FIG. 5) can be included in either or both the multimedia communication system 10 and the end-user communication device 40.

Referring to FIGS. 5 and 8 concurrently, auxiliary display (AD) content can be received by the MCM system 100 (Step 205). The AD content can be received by itself or as part of multimedia content and parsed from the multimedia content. The AD content can be forwarded and applied to an input of the overlay processor 160 (shown in FIG. 5), wherein image data in the AD content can be analyzed by the overlay processor 160 (Step 210). The image data can be analyzed to detect and identify (or predict) any discernible objects or background (Step 215). The image data can also be analyzed to detect whether any special effect is included in the AD content, as well as any detectable action by the object or background in the AD content (Step 215). Based on the identified (or predicted) objects or background, and identified (or predicted) overlay or action by the object or background, the overlay processor 160 can determine a type of special effect to apply to display properties for the AD content (Step 220), including NO CUSTOMIZATION (or NON-CUSTOMIZATION), SIMPLE FOREGROUND, or SELECTIVE.

FIGS. 16A to 16C depict a nonlimiting example of an image data analysis that can be performed by the overlay processor 160 in Step 215. As seen, AD content 52 can be received that includes a main object 32 (for example, person) and background objects 38 (for example, laptop) and 39 (for example, back of second person). The overlay processor 160 can analyze the image data and, using a combination of depth estimation (for example, depicted in FIG. 16B) and instance segmentation (for example, depicted in FIG. 16C), obtain an object- and depth-aware layer representation that identifies the objections 32, 38, 39 and their distance with respect to the image pickup device (not shown) that was used to take the photo, or the virtual image pickup device in the case of machine generated AD content 52. In this example, objects 32, 38 and 39 can have inverse depths 0.35, 0.56 and 0.92, respectively. Both depth estimation and instance segmentation can be powered by, for example, a DCNN in the overlay processor 160.

The overlay processor 160 can also use depth to eliminate objects in the background, and to refine layer boundaries. For instance, in the example depicted in FIGS. 16A to 16C, instance segmentation detected two people (32, 39) and the laptop (38) between them. The overlay processor 160 can use depth to eliminate the second person 39, who appears to be in the background, and also to make the layer boundaries snap more tightly to the person 32. The special effect 57 can include a border that binds closely to the person 32, such as, for example, surrounding the person 32, but display a break in the border so that the person's head extends outside the frame created by the border, for example, as seen in the example in FIG. 14.

FIG. 9 depicts another nonlimiting example of AD content 52 analyzed by the overlay processor 160 and rendered with the special effect 57, which in this example includes treating a border as a physical object, like a planar picture frame. The frame can be rendered such that it is placed into the scene. The frame can be rendered in multiple ways, and having the segmentation and the depth layers allows the overlay processor 160 to figure out how the occlusions should work out. In this example, the overlay processor 160 can either place the frame behind the car, or somewhere in between allowing only a portion of the car to pop out of the frame, making it look like the car driving into or out of the frame.

As noted above, the overlay processor 160 can generate and implement other special effects, such as, for example, animating text to make it move behind a subject, rotating the border, brightening/darkening/blurring the background, or applying different stylistic effects on the foreground vs. background. This can make a static image appear to come to life.

FIGS. 10-14 depict further nonlimiting examples of AD content that can be identified (or predicted) by the overlay processor 160 to include image data for which display properties can be modified according to one of the three exemplary overlay types (Step 220, NO CUSTOMIZATION, SIMPLE FOREGROUND, SELECTIVE FOREGROUND).

For instance, the overlay processor 160 can determine the NO CUSTOMIZATION special effect type (Step 220) if it determines (in Step 215) the AD content: does not include any clear or discernible foreground (for example, shown in FIG. 2) (Case #1); or contains primarily foreground (for example, shown in FIGS. 11, 13, 14) (Case #2); or contains an action scene (for example, shown in FIG. 12) (Case #3). Cases #1 to #3 are provided for illustrative purposes only, and do not in any way represent the broad range of possible AD content for which the NO CUSTOMIZATION special effect type might be selected. Based on the detected (or predicted) foreground (or object) (Step 220, NO CUSTOMIZATION), the overlay processor 160 can modify the display properties for the AD content to either apply a special effect (for example, overlay border) or edit an existing special effect (for example, overlay border) in the AD content (Step 225). The modified AD content can be rendered (with or without MD content) on the display device (for example, display device 354, shown in FIG. 4), for example, by or in response to data and instructions provided by the multimedia content renderer 170 (shown in FIG. 5) (Step 250). The modified AD content can include a special effect that, when rendered by the end-user communication device 40, is displayed, for example, as a border overlay along the inner edges of the entirety of the content slot on the display screen allocated to the AD content (or "AD content display window"), as seen in, for example, FIG. 2.

In Case #1, the AD content might include, for example, only a backdrop (for example, a blue screen), an image of a forest, or any other image that lacks any object of interest or focal point. In that instance, the overlay processor 160 can modify the display properties (in Step 225) to create and apply a special effect, such as, for example, an overlay border, to the AD content without any customization, avoiding overlay on top of any logo, text, call-to-action selectors or other displayable features that are to be visible to the user (for example, shown in FIG. 15). If, however, the received AD content includes an existing special effect, such as, for example, an overlay border, then the display properties can be modified to ensure the border does not overlay on top of any logo, text, call-to-action, or other displayable features that should be visible to the user.

Figure 13:
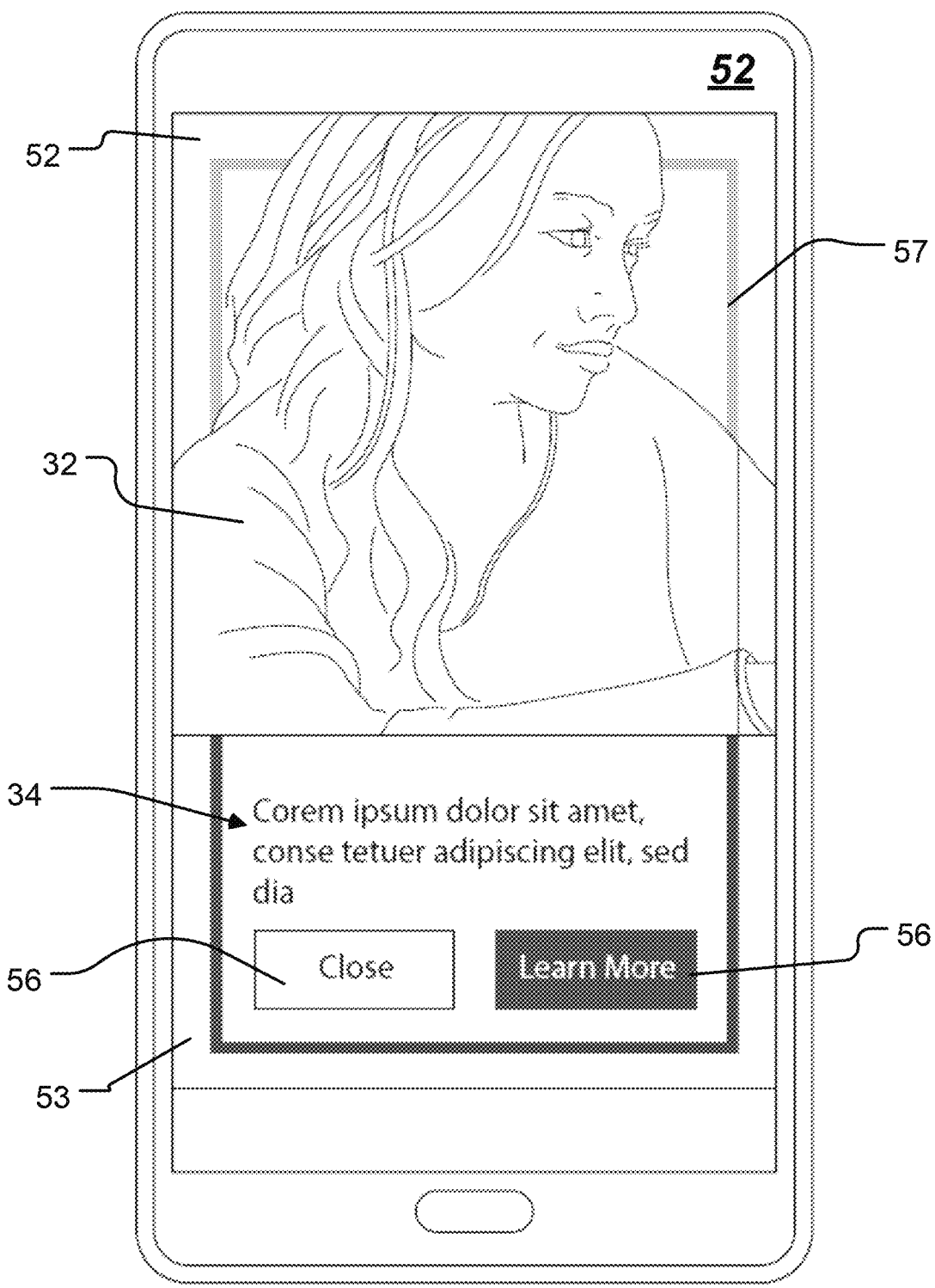

In Case #2, the AD content might include a foreground image (or object) that occupies, for example, more than ninety-percent (90%) of the AD content display window, as seen in the example shown in FIG. 11 or 13. In that instance, the overlay processor 160 can modify the display properties (in Step 225) to create and apply a partial special effect, such as, for example, a partial overlay border (including an overlay portion and a non-overlay portion) to the AD content such that the border has at least one corner and the visible part of the border is at least fifteen-percent (15%) of the total height of the border, as seen in the example, shown in FIG. 11. If, however, the AD content includes an existing special effect (for example, overlay border), then the display properties for the special effect can be modified to provide, in this nonlimiting example, an overlay portion and a non-overlay portion by, for example, removing one or more portions of the border, such that the border has at least one corner and the visible part of the border is at least 15% of the total height of the border. In this particular example, the overlay processor 160 can determine that there are two people in the scene, one person (39) close to the image pickup device and one person (32) further away, with the laptop (38) between them. With this information, the overlay processor 160 can guide selection and/or placement of the special effect, such as, for example, the overlay border.

Figure 12:
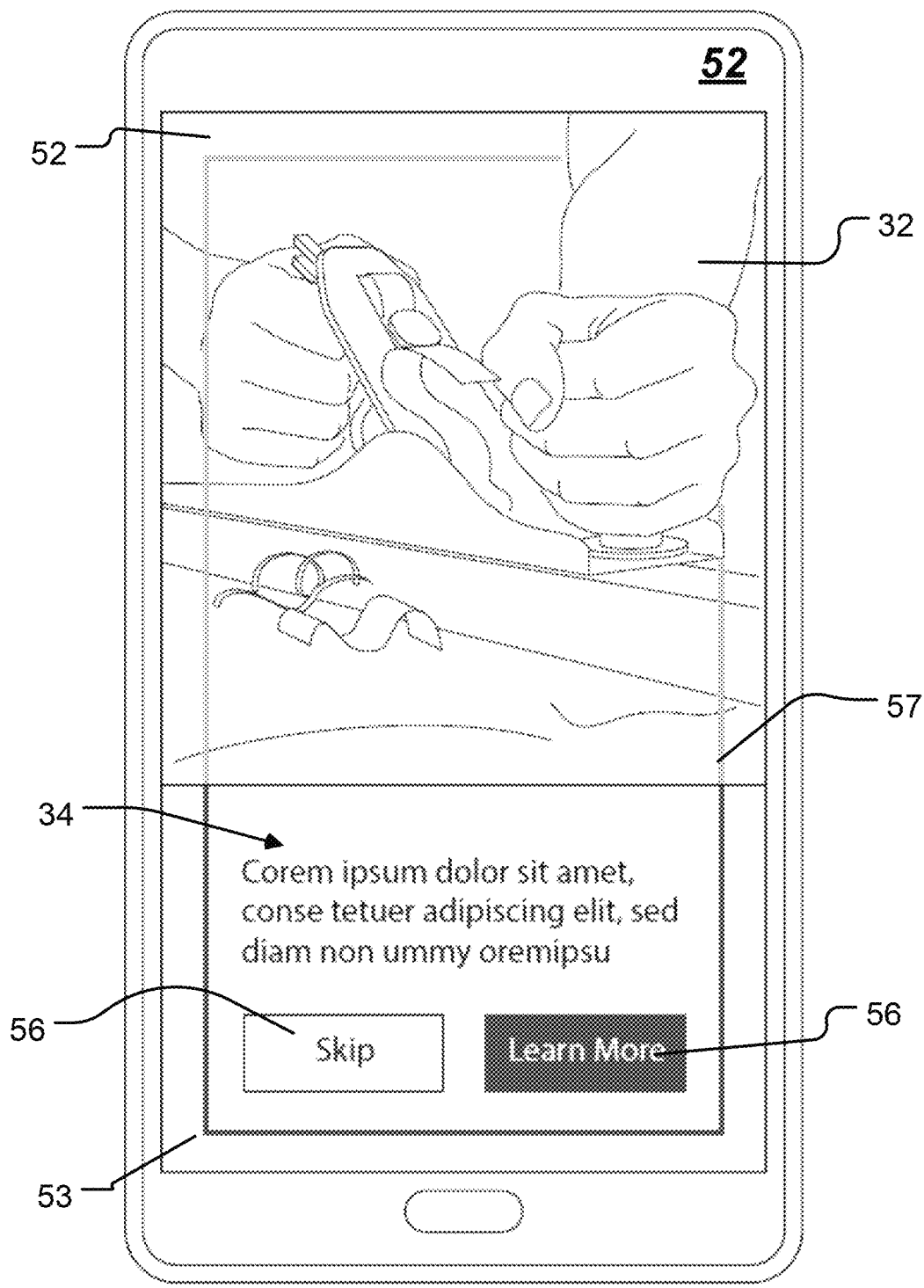

In Case #3, the AD content might include an action scene, such as, for example, shown in FIG. 12. In that instance, where the special effect comprises an overlay border that might interfere with the action depicted in the AD content, the overlay processor 160 can modify the display properties (in Step 225) to enhance the action shown in the image by, for example, creating and applying a partial overlay border to the AD content (or removing a portion of preexisting border) so that an overlay portion and a non-overlay portion emphasize or highlight an action depicted in the AD content. FIG. 12 shows a nonlimiting example of an overlay border that can be applied (or modified) on the image in the AD content, including a partial overlay portion and a non-overlay portion.

The overlay processor 160 can determine the SIMPLE FOREGROUND special effect type (Step 220) if it determines (in Step 215) the AD content includes a clear foreground (or object) with a good ratio of foreground to background in the AD content (for example, shown in FIG. 11) (Case #4). In that instance, the overlay processor 160 can modify the display properties for the AD content to apply a partial special effect, such as, for example, a partial overlay border (Step 230). For example, the overlay processor 160 can create and apply a partial overlay border, or edit and remove a portion of a preexisting border such that the overlay border includes a non-overlay portion (or break in the overlay) such that the overlay does not overlap the foreground (or object) or a portion thereof, thereby creating an illusion of depth when the AD content is rendered on the display device 354 (shown in FIG. 4) of the end-user communication device 40. The modified AD content can be rendered (with or without MD content) on the display device 354 (shown in FIG. 4), for example, by, or in response to data and instructions provided by the multimedia content renderer 170 (shown in FIG. 5) (Step 250).

The overlay processor 160 can determine the SELECTIVE FOREGROUND overlay type (Step 220) if it determines (in Step 215) the AD content includes: an object, such as, for example, a product (e.g., vehicle) that has a directional orientation (for example, shown in FIG. 9) (Case #5); or an object, such as, for example, an animal (e.g., a portrait of a human, a cat, a dog, etc.) (for example, shown in FIG. 11) (Case #6); or an action scene wherein the action can be enhanced, for example, by zooming in or out a portion of the action scene (for example, shown in FIG. 12) (Case #7).

Figure 14:
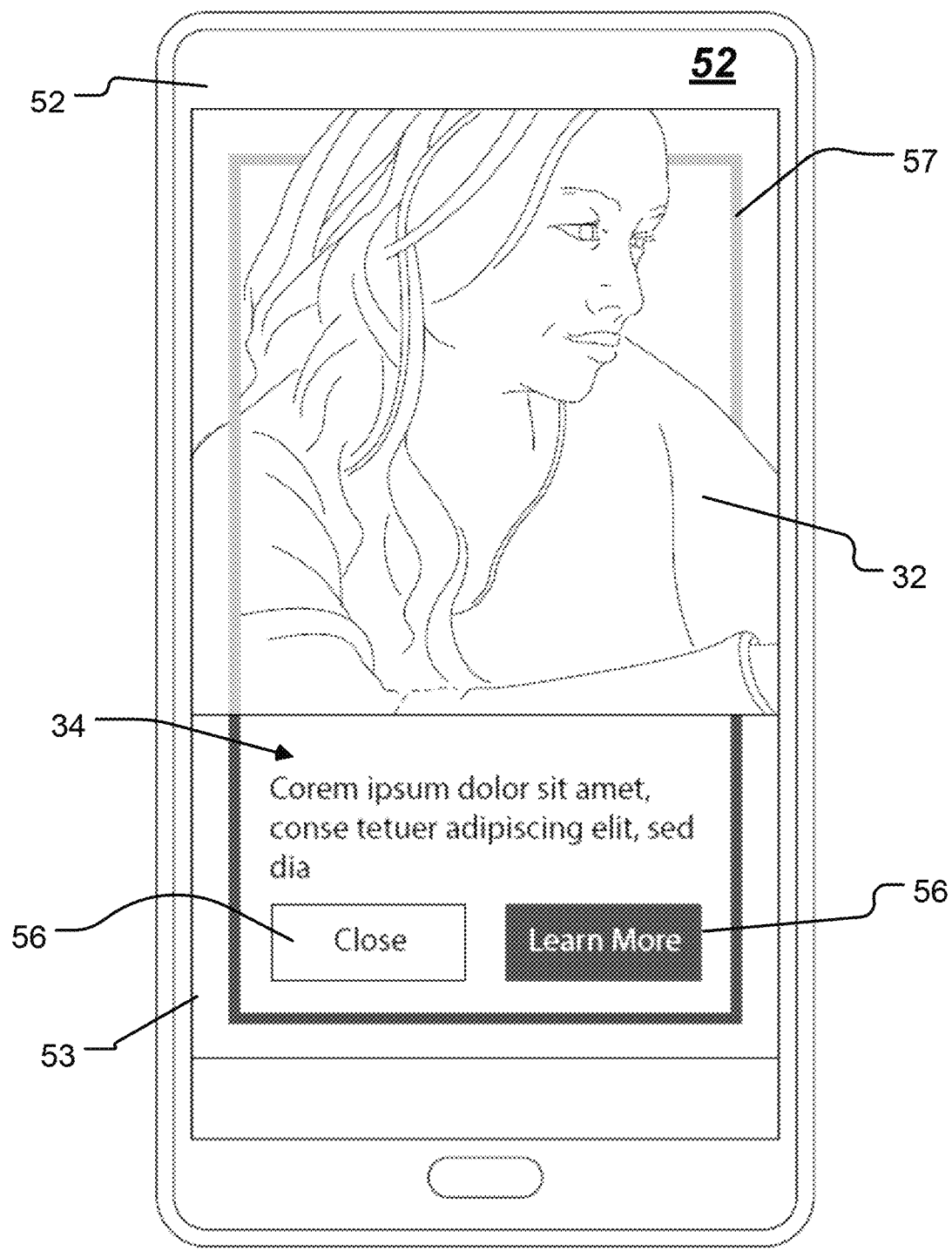
Figure 15:
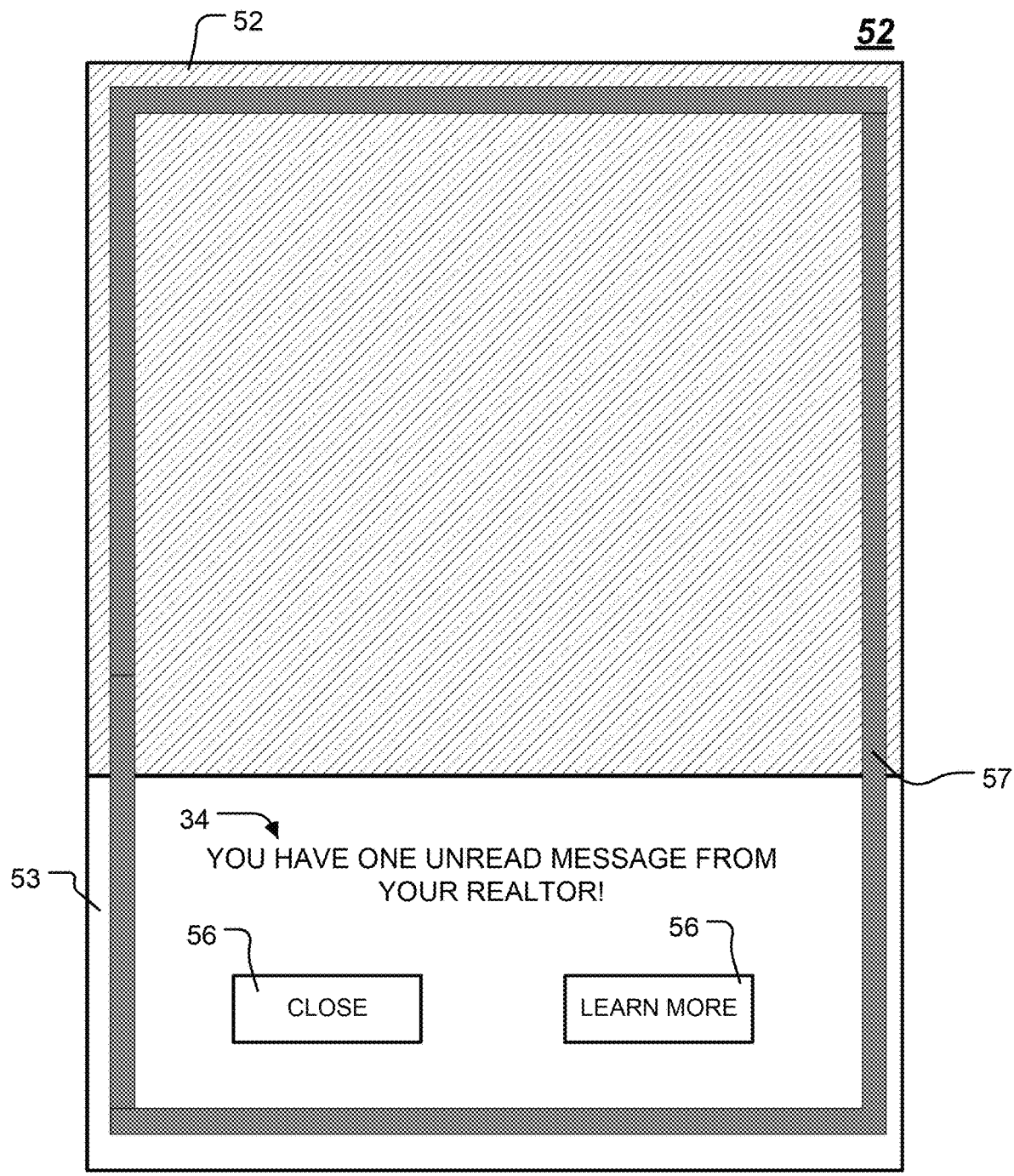

In Case #5, the AD content might include, for example, a vehicle (for example, shown in FIG. 9), in which case the overlay processor 160 can determine the directional orientation of the vehicle (in Step 215) and modify the display properties for the AD content to create and apply, or to edit an existing special effect, such as, for example, an overlay border, in the AD content (Step 235). Based on the object and its directional orientation, the overlay processor 160 can modify the display properties of the AD content to apply a partial overlay border (or remove a portion of an existing border) to provide an overlay portion and a non-overlay portion that create an illusion of motion or dynamics to the object, for example, as shown in FIG. 9, 12 or 14.

In Case #6, the AD content might include, for example, a portrait of a person (for example, shown in FIG. 11 or 13), in which case the overlay processor 160 can determine an outline and/or directional orientation of the person (in Step 215) and modify the display properties for the AD content to create and apply, or to edit an existing special effect, such as, for example, an overlay border, in the AD content (Step 235). Based on the position of the person and/or directional orientation, the overlay processor 160 can modify the display properties of the AD content to apply a partial overlay border, or remove a portion of an existing border that overlay the person's head, as shown in FIGS. 11 and 13.

In Case #7, the AD content might include, for example, an action scene wherein the action can be enhanced by a customizable special effect (for example, an overlay border as seen in FIG. 12) or complemented with another special effect, such as, for example, zooming in or out a portion of the action scene (for example, shown in FIG. 13). In the former instance, the overlay processor 160 can modify the display properties (in Step 235) to enhance the action shown in the image by, for example, creating and applying a partial overlay border to the AD content (or removing a portion of preexisting border) so that action is emphasized, as shown, for example, in FIG. 12.

In the latter instance, a determination can be made by the overlay processor 160 whether a portion of the image in the AD content should be modified to further emphasize the action the AD content (Step 240). If, for example, the overlay processor 160 determines that an action (for example, shown in FIG. 12 or 13) can be further emphasized by applying a special effect such as, for example, zooming in or out a portion of the image (YES at Step 240), then the display properties for the AD content can be further modified to modify the image (Step 245), in addition to modification or application of the overlay border special effect (Step 235); otherwise (NO at Step 245), the modified AD content can be rendered (with or without MD content) on the display device 354 (shown in FIG. 4), for example, by, or in response to data and instructions provided by the multimedia content renderer 170 (shown in FIG. 5) (Step 250).

The terms "a," "an," and "the," as used in this disclosure, means "one or more," unless expressly specified otherwise.

The term "backbone," as used in this disclosure, means a transmission medium that interconnects one or more computing devices or communicating devices to provide a path that conveys data signals and instruction signals between the one or more computing devices or communicating devices. The backbone can include a bus or a network. The backbone can include an ethernet TCP/IP. The backbone can include a distributed backbone, a collapsed backbone, a parallel backbone or a serial backbone.

The term "bus," as used in this disclosure, means any of several types of bus structures that can further interconnect to a memory bus (with or without a memory controller), a peripheral bus, or a local bus using any of a variety of commercially available bus architectures. The term "bus" can include a backbone.

The term "communication device," as used in this disclosure, means any hardware, firmware, or software that can transmit or receive data packets, instruction signals, data signals or radio frequency signals over a communication link. The communicating device can include a computer or a server. The communicating device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 302.11, DECT, 0G, 1G, 2G, 3G, 4G, or 5G cellular standards, or Bluetooth. A communication link can include, for example, an RS-232, RS-422, RS-485, or any other suitable serial interface.

The terms "computer," "computing device," or "processor," as used in this disclosure, means any machine, device, circuit, component, or module, or any system of machines, devices, circuits, components, or modules that are capable of manipulating data according to one or more instructions. The terms "computer," "computing device" or "processor" can include, for example, without limitation, a processor, a microprocessor (µC), a central processing unit (CPU), a graphic processing unit (GPU), an application specific integrated circuit (ASIC), a general purpose computer, a super computer, a personal computer, a laptop computer, a palmtop computer, a notebook computer, a desktop computer, a workstation computer, a server, a server farm, a computer cloud, or an array or system of processors, µCs, CPUs, GPUs, ASICs, general purpose computers, super computers, personal computers, laptop computers, palmtop computers, notebook computers, desktop computers, workstation computers, or servers.

The terms "computing resource" or "computer resource," as used in this disclosure, means software, a software application, a web application, a web page, a computer application, a computer program, computer code, machine executable instructions, firmware, or a process that can be arranged to execute on a computing device as one or more computing resource processes.

The term "computing resource process," as used in this disclosure, means a computing resource that is in execution or in a state of being executed on an operating system of a computing device. Every computing resource that is created, opened or executed on or by the operating system can create a corresponding "computing resource process." A "computing resource process" can include one or more threads, as will be understood by those skilled in the art.

The terms "computer resource asset" or "computing resource asset," as used in this disclosure, means a computing resource, a computing device or a communicating device, or any combination thereof.

The term "computer-readable medium," as used in this disclosure, means any non-transitory storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random-access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "cloud," which can include a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 302.11, DECT, 0G, 1G, 2G, 3G, 4G, or 5G cellular standards, or Bluetooth.

The term "database," as used in this disclosure, means any combination of software or hardware, including at least one computing resource or at least one computer. The database can include a structured collection of records or data organized according to a database model, such as, for example, but not limited to at least one of a relational model, a hierarchical model, or a network model. The database can include a database management system application (DBMS). The at least one application may include, but is not limited to, a computing resource such as, for example, an application program that can accept connections to service requests from communicating devices by sending back responses to the devices. The database can be configured to run the at least one computing resource, often under heavy workloads, unattended, for extended periods of time with minimal or no human direction.

The terms "including," "comprising" and their variations, as used in this disclosure, mean "including, but not limited to," unless expressly specified otherwise.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or the like, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP.

The term "server," as used in this disclosure, means any combination of software or hardware, including at least one computing resource or at least one computer to perform services for connected communicating devices as part of a client-server architecture. The at least one server application can include, but is not limited to, a computing resource such as, for example, an application program that can accept connections to service requests from communicating devices by sending back responses to the devices. The server can be configured to run the at least one computing resource, often under heavy workloads, unattended, for extended periods of time with minimal or no human direction. The server can include a plurality of computers configured, with the at least one computing resource being divided among the computers depending upon the workload. For example, under light loading, the at least one computing resource can run on a single computer. However, under heavy loading, multiple computers can be required to run the at least one computing resource. The server, or any if its computers, can also be used as a workstation.

The term "transmission" or "transmit," as used in this disclosure, means the conveyance of data, data packets, computer instructions, or any other digital or analog information via electricity, acoustic waves, light waves or other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

Devices that are in communication with each other need not be in continuous communication with each other unless expressly specified otherwise. In addition, devices that are in communication with each other may communicate directly or indirectly through one or more intermediaries.

Although process steps, method steps, or algorithms may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described in this specification may be performed in any order practical.

When a single device or article is described, it will be readily apparent that more than one device or article may be used in place of a single device or article. Similarly, where more than one device or article is described, it will be readily apparent that a single device or article may be used in place of the more than one device or article. The functionality or the features of a device may be alternatively embodied by one or more other devices which are not explicitly described as having such functionality or features.

What is claimed is:

1. A multimedia communication system for transmitting auxiliary display content to an end-user communication device to be rendered on a display device with a special effect to emphasize an image included in the auxiliary display content, the multimedia communication system comprising:
    a processor that is arranged to:
        analyze image data included in an auxiliary display content;
        detect at least a foreground image and a background image in the auxiliary display content based on the analysis of the image data;
        determine a special effect to emphasize the foreground image based on the analysis of the image data, wherein the special effect comprises a predetermined shape with a plurality of portions overlapping with the foreground image and at least one portion overlapping with a portion of the background image; and
        apply the special effect to the auxiliary display content by adding the predetermined shape such that at least one of the plurality of portions overlapping with the foreground image is a non-overlay portion, at least another one of the plurality of portions overlapping with the foreground image is an overlay portion, and the at least one portion of the predetermined shape overlapping with the portion of the background image overlays the portion of the background image; and,
    a transmitter arranged to send the auxiliary display content with the applied special effect to an end-user communication device.

2. The multimedia communication system of claim 1, wherein the processor is arranged to:
    generate or modify a multimedia content rendering application; and
    send the multimedia content rendering application to the end-user communication device,
    wherein the multimedia content rendering application is arranged to, when executed by a processor in the end-user communication device, render the auxiliary display content with the applied special effect on a display device.

3. The multimedia communication system of claim 1, wherein the special effect comprises a non-customization special effect that comprises a border effect that, when rendered by the end-user communication device, is displayed around an inner border of an auxiliary display content display window on a display device.

4. The multimedia communication system of claim 3, wherein the border effect comprises at least one corner and the non-overlay portion that emphasize an object image in the auxiliary display content.

5. The multimedia communication system of claim 1, wherein the special effect comprises a simple foreground special effect that comprises a border effect comprising the non-overlay portion that, when rendered by the end-user communication device, is displayed atop of the background image in an auxiliary display content display window, with an object image being displayed without any overlay in the auxiliary display content display window.

6. The multimedia communication system of claim 5, wherein the overlay border has at least one corner and the non-overlay portion is rendered to emphasize the object image or an action depicted in the auxiliary display content.

7. The multimedia communication system of claim 1, wherein the special effect comprises a selective foreground special effect that comprises an overlay border having the overlay portion and the non-overlay portion that, when rendered by the end-user communication device, is displayed as an overlay border atop of the background image in an auxiliary display content display window, with at least a portion of an object image being displayed without any overlay in the auxiliary display content display window.

8. The multimedia communication system of claim 1, wherein the special effect comprises a selective foreground special effect that comprises a zoom-in or a zoom-out of an object image, or a blurring of the background image when rendered by the end-user communication device.

9. The multimedia communication system of claim 8, wherein the selective foreground special effect further comprises zooming-in or zooming-out an object image when rendered by the end-user communication device.

10. A computer-implemented method for transmitting auxiliary display content to an end-user communication device to be rendered on a display device with a special effect to emphasize an image included in the auxiliary display content, the method comprising:
    analyzing, by a processor, image data included in an auxiliary display content;
    detecting, by the processor, at least a foreground image and a background image in the auxiliary display content;
    determining, by the processor, a special effect to emphasize the foreground image based on the analysis of the image data, wherein the special effect comprises a predetermined shape with a plurality of portions overlapping with the foreground image and at least one portion overlapping with a portion of the background image; and
    applying, by the processor, the special effect to the auxiliary display content by adding the predetermined shape such that at least one of the plurality of portions overlapping with the foreground image is a non-overlay portion, at least another one of the plurality of portions overlapping with the foreground image is an overlay portion, and the at least one portion of the predetermined shape overlapping with the portion of the background image overlays the portion of the background image.

11. The method of claim 10, further comprising:
creating a multimedia content rendering application; and
sending the multimedia content rendering application to an end-user communication device,
wherein the multimedia content rendering application is arranged to, when executed by a processor in the end-user communication device, render the auxiliary display content with the applied special effect on a display device.

12. The method of claim 10, wherein the special effect comprises a non-customization special effect that comprises an overlay border that, when rendered by an end-user communication device, is displayed around an inner-border of an auxiliary display content display window on a display device.

13. The method of claim 12, wherein the overlay border has at least one corner and the non-overlay portion that emphasize an object image in the auxiliary display content.

14. The method of claim 10, wherein the special effect comprises a simple foreground special effect that comprises an overlay border having the non-overlay portion that, when rendered by an end-user communication device, is displayed as an overlay border atop of the background image in an auxiliary display content display window, with an object image being displayed without any overlay in the auxiliary display content display window.

15. The method of claim 14, wherein the overlay border has at least one corner and the non-overlay portion is rendered to emphasize the object image or an action depicted in the auxiliary display content.

16. The method of claim 10, wherein the special effect comprises a selective foreground special effect that comprises a zoom-in or a zoom-out of an object image when rendered by an end-user communication device, or a blurring of the background image when rendered by the end-user communication device.

17. The method of claim 16, wherein the selective foreground special effect further comprises zooming-in or zooming-out an object image when rendered by the end-user communication device.

18. The method of claim 10, wherein the special effect comprises a selective foreground special effect that comprises an overlay border having the overlay portion and the non-overlay portion that, when rendered by an end-user communication device, is displayed as an overlay border atop of the background image in an auxiliary display content display window, with at least a portion of an object image being displayed without any overlay in the auxiliary display content display window.

* * * * *